(12) United States Patent
Johnson et al.

(10) Patent No.: US 11,594,078 B2
(45) Date of Patent: Feb. 28, 2023

(54) SYSTEM AND METHOD FOR SCHEDULING BASED ON VEHICLE CONDITION REPORTED BY VEHICLE

(71) Applicant: Mitchell Repair Information Company, LLC, Poway, CA (US)

(72) Inventors: Lester B. Johnson, Escondido, CA (US); John H. Dwulet, Lakeside, CA (US)

(73) Assignee: Mitchell Repair Information Company, LLC, Poway, CA (US)

( * ) Notice: Subject to any disclaimer, the term of this patent is extended or adjusted under 35 U.S.C. 154(b) by 106 days.

(21) Appl. No.: 16/796,927

(22) Filed: Feb. 20, 2020

(65) Prior Publication Data

US 2020/0193727 A1 Jun. 18, 2020

Related U.S. Application Data

(63) Continuation of application No. 15/798,371, filed on Oct. 30, 2017, now Pat. No. 10,650,615.

(51) Int. Cl.
*G07C 5/00* (2006.01)
*G07C 5/08* (2006.01)
(Continued)

(52) U.S. Cl.
CPC ......... *G07C 5/006* (2013.01); *G06Q 10/1095* (2013.01); *G07C 5/008* (2013.01); *G07C 5/0841* (2013.01)

(58) Field of Classification Search
CPC .... G05D 1/0214; G05D 1/0274; G05D 1/028; G05D 1/0278; G05D 1/0061;
(Continued)

(56) References Cited

U.S. PATENT DOCUMENTS 6,301,531 B1 10/2001 Pierro et al.
6,927,682 B1 8/2005 Touhey et al.
(Continued)

OTHER PUBLICATIONS

Autocare Association, Welcome to Auto Care Insider 101, Auto Care Insider magazine, vol. 101, www.autocare.org, Aug. 2016 (25 pages).
(Continued)

*Primary Examiner* — Thomas Ingram
(74) *Attorney, Agent, or Firm* — McDonnell Boehnen Hulbert & Berghoff LLP

(57) ABSTRACT

A method and system that can be used to generate or modify a schedule using data indicative of a vehicle condition reported by a vehicle is described. A server receives a first computer network transmission (CNT) comprising data indicative of the vehicle and the vehicle condition, parses the first CNT to obtain the data indicative of the vehicle and the data indicative of the vehicle condition; determines, based on the data indicative of the vehicle, a computer network address associated with a repair shop having a client disposed at the address to display content of a scheduler application, and transmits to the client disposed at the address, a second CNT comprising data to cause the client to display as part of the content of the scheduler application served by computing server an alert indicator and parsed data indicative of the vehicle and the parsed data indicative of the vehicle condition.

20 Claims, 19 Drawing Sheets

(51) Int. Cl.
*G06Q 10/10* (2012.01)
*G06Q 10/1093* (2023.01)

(58) Field of Classification Search
CPC ......... G05D 1/0223; G05D 2201/0213; G01C 21/3484; G01C 21/3461
See application file for complete search history.

(56) References Cited

U.S. PATENT DOCUMENTS

| | | | |
|---|---|---|---|
| 7,565,306 B2* | 7/2009 | Apostolides | G06Q 40/025 705/7.26 |
| 7,930,268 B2 | 4/2011 | Starkey et al. | |
| 7,945,438 B2 | 5/2011 | Balmelli et al. | |
| 8,150,721 B2 | 4/2012 | Apostolides | |
| 8,185,446 B1 | 5/2012 | Kuznetsova et al. | |
| 8,924,071 B2 | 12/2014 | Stanek et al. | |
| 8,977,423 B2 | 3/2015 | Merg et al. | |
| 9,141,935 B2* | 9/2015 | Apostolides | G06Q 10/10 |
| 9,355,549 B2 | 5/2016 | McClintic et al. | |
| 9,530,121 B2 | 12/2016 | Brauer et al. | |
| 2002/0007289 A1 | 1/2002 | Malin et al. | |
| 2002/0080022 A1 | 6/2002 | Edwards | |
| 2002/0111844 A1* | 8/2002 | Vanstory | G06Q 10/06 705/7.13 |
| 2002/0133271 A1 | 9/2002 | McDermott et al. | |
| 2002/0195503 A1 | 12/2002 | Allen, Jr. et al. | |
| 2003/0095038 A1* | 5/2003 | Dix | G07C 5/085 340/425.5 |
| 2003/0163233 A1 | 8/2003 | Song et al. | |
| 2004/0249531 A1 | 12/2004 | Kelly et al. | |
| 2006/0020477 A1* | 1/2006 | Retzbach | G06Q 10/00 705/1.1 |
| 2006/0095174 A1 | 5/2006 | Sonnenrein et al. | |
| 2006/0206807 A1 | 9/2006 | Rosner et al. | |
| 2007/0100529 A1 | 5/2007 | Blythe et al. | |
| 2007/0174284 A1 | 7/2007 | Hashimoto et al. | |
| 2008/0208609 A1 | 8/2008 | Preece et al. | |
| 2008/0243488 A1 | 10/2008 | Balmelli et al. | |
| 2008/0270477 A1 | 10/2008 | Starkey et al. | |
| 2008/0288346 A1 | 11/2008 | Shames | |
| 2011/0258654 A1 | 10/2011 | Lee et al. | |
| 2012/0296513 A1 | 11/2012 | Ramseyer | |
| 2013/0138467 A1 | 5/2013 | Small et al. | |
| 2014/0085086 A1* | 3/2014 | Knapp | G06Q 30/0206 340/540 |
| 2014/0188329 A1 | 7/2014 | Chen et al. | |
| 2014/0297097 A1 | 10/2014 | Hurwitz | |
| 2015/0039522 A1 | 2/2015 | Dillard et al. | |
| 2015/0066781 A1 | 3/2015 | Johnson et al. | |
| 2015/0081161 A1 | 3/2015 | Chapman et al. | |
| 2016/0042576 A1 | 2/2016 | Fischer et al. | |
| 2016/0071334 A1 | 3/2016 | Johnson et al. | |
| 2016/0104127 A1 | 4/2016 | Apostolides | |
| 2016/0124587 A1 | 5/2016 | Covington et al. | |
| 2016/0133066 A1* | 5/2016 | Lavie | G07C 5/08 701/31.4 |
| 2016/0216849 A1 | 7/2016 | Kawalkar et al. | |
| 2016/0314103 A1 | 10/2016 | Fox et al. | |
| 2016/0335816 A1 | 11/2016 | Thoppae et al. | |
| 2017/0124525 A1 | 5/2017 | Johnson et al. | |
| 2017/0263120 A1 | 9/2017 | Durie, Jr. et al. | |
| 2018/0018642 A1 | 1/2018 | Schmitz et al. | |
| 2019/0130658 A1 | 5/2019 | Johnson et al. | |
| 2019/0130668 A1 | 5/2019 | Johnson et al. | |
| 2019/0251759 A1 | 8/2019 | Lora et al. | |

OTHER PUBLICATIONS

Best Connected Car Devices of 2017, Connected Car Devices, OBD2 Monitoring and Driving Assistance Devices and Apps, catalog downloaded Nov. 6, 2017 from the world wide web at https:\\www.postscapes.com/connected-car-devices/ (11 pages).
Chabot, B., The Vehicle Communication Interface Revolution, MACS Service Reports, article, The Mobile Air Conditioning Society Worldwide, Nov. 2016 (9 pages).
Geotab GO7, Expandable Plug-&-Play Telematics Device, Geotab Inc., Management by Measurement, data sheets and instructions downloaded Nov. 6, 2017 from the world wide web at goo.gl/5zcEWm (6 pages).
How Connected Vehicles Work, U.S. Department of Transportation brochure, Oct. 2015 (2 pages).
IMC Your Quality Source, Steps to install IMC Catalog in Mitchell1, Interamerican Motor Corporation, instruction sheets downloaded Nov. 6, 2017 from the world wide web at http://www.imcparts.net/shopMgmt/index.shtml, (7 pages).
Automatic Pro—Automatic: connect your car to your digital life; archived at https://web.archive.org/web/20170623022612/https://www.automatic.com/pro/, Jun. 23, 2017 (10 pages).
Mitchell 1 and ShopKey, Version 7 Shop Management Software, Installation and Registration Guide, Mitchell Repair Information Company, LLC, Jun. 2017 (12 pages).
Mitchell 1, Manager SE, ShopKey Management Solutions, SETUP: Configuring Your LIVE SE Software, Guide to system setting for the LIVE version of SE 7.x program, Mitchell Repair Information Company, LLC, Sep. 2017 (44 pages).
Mitchell 1, Manager SE, Auto Shop Management, online brochure, downloaded Nov. 6, 2017 from the world wide web at http://www.mitchellone.ca/manager-se/truck-edition/, Mitchell Repair Information Company, LLC, (3 pages).
Mitchell 1, Manager SE, In your shop, at your side, brochure, Mitchell Repair Information Company, LLC, Feb. 2016 (6 pages).
Mitchell 1/ShopKey Schedule Configuration and User's Guide, Version 7.1x Update, Mitchell Repair Information Company, LLC, Feb. 2017 (22 pages).
Mitchell 1 Top 20 Tips for Manager SE, In your shop, at your side, instruction sheets, Mitchell Repair Information Company, LLC, Apr. 2016 (24 pages).
PubNub, What is HTTP Long Polling?, information sheets downloaded from the world wide web at https://www.pubnub.com/blog/2014-12-01-http-long-polling/, Dec. 1, 2014, (6 pages).
Voyomotive, VOYO and PASSPORT Advanced Data Parameters, specification sheets, Voyomotive.com, Sep. 2017 (3 pages).
Zubie Fact Sheet, Zubie, Inc., downloaded from the world wide web at zubie.com/wp-content/uploads/2014/04/Zubie-Fact-Sheet.pdf, Apr. 2014 (3 pages).
Bridgestone Americas Tire Operations, LLC; Maintenance Schedule—Firestone Complete Auto Care, Your 2013 Ford Mustang Shelby GT500 Scheduled Maintenance; downloaded from the World Wide Web at https://www.firestonecompleteautocare.com/maintain/schedule/maintenance-schedule/ on Jul. 13, 2016, 3 pages.
Total Auto Business Solutions, Inc.; AutoFluent Manual; Sep. 14, 2016, cover sheet, 4 pages of table of content, and pp. 4 to 228.

* cited by examiner

SYSTEM AND METHOD FOR SCHEDULING BASED ON VEHICLE CONDITION REPORTED BY VEHICLE

REFERENCE TO RELATED APPLICATION

This application is a continuation application of U.S. patent application Ser. No. 15/798,371 filed on Oct. 30, 2017. The entirety of U.S. patent application Ser. No. 15/798,371 is incorporated herein by reference.

BACKGROUND

Most vehicles are serviced at least once during their useful life. In many instances, a vehicle is serviced at a repair shop by a professional mechanic (e.g., a repair technician). The repair shop may be referred to by various names such as a service shop, a vehicle shop, or more simply a shop.

The technician at a repair shop may use any of a variety of hand tools to service (e.g., repair) a mechanical component on a vehicle. The technician may also use an electronic diagnostic device to service (e.g., diagnose) an electrical component on a vehicle. The technician may use another shop resource or equipment at the repair shop to service a vehicle. In some instances, the technician demand for tools, equipment or shop resources may be greater than the available supply of the tools, equipment or shop resources at the shop where the technicians needing the tools, equipment or shop resources are located.

Typically, a vehicle owner or a vehicle user places a telephone call to make a vehicle service appointment at a repair shop. In the past, a service advisor or service manager would list a vehicle service appointment on a paper schedule located at the repair shop. More recently, the service advisor or service manager might add the vehicle service appointment into a scheduler application operating on a local computing device based on information gathered from the telephone call with the vehicle owner or vehicle user. Under these typical circumstances, the schedule application is not updated based on data indicative of a vehicle condition of a vehicle reported by the vehicle.

OVERVIEW

Several example embodiments that relate to generating, modifying, and/or reconfiguring a vehicle shop schedule or an appointment within the vehicle shop schedule are described. A vehicle shop schedule can comprise one or more appointments. A client computing device can output a vehicle shop schedule for displaying in one or more different schedule views.

Viewed from one aspect, an example embodiment takes the form of a method comprising: (i) receiving, by a computing server, a first computer network transmission comprising data indicative of a vehicle and data indicative of a vehicle condition of the vehicle reported by the vehicle, (ii) parsing, by the computing server, the first computer network transmission to obtain the data indicative of the vehicle and the data indicative of the vehicle condition of the vehicle reported by the vehicle, (iii) determining, by the computing server based on the data indicative of the vehicle, a computer network address associated with a repair shop having a client computing device disposed at the computer network address to display content of a scheduler application served by the computing server, and (iv) transmitting, by the computing server to the client computing device disposed at the computer network address associated with the repair shop, a second computer network transmission comprising data to cause the client computing device to display as part of the content of the scheduler application served by computing server an alert indicator and parsed data indicative of the vehicle and the parsed data indicative of the vehicle condition of the vehicle reported by the vehicle.

Viewed from another aspect, an example embodiment takes the form of a computing system comprising: a computer-readable memory, at least one processor coupled to the computer-readable memory, and program instructions stored on the computer-readable memory and executable by the at least one processor to: (i) receive a first computer network transmission comprising data indicative of a vehicle and data indicative of a vehicle condition of the vehicle reported by the vehicle, (ii) parse the first computer network transmission to obtain the data indicative of the vehicle and the data indicative of the vehicle condition of the vehicle reported by the vehicle, (iii) determine, based on the data indicative of the vehicle, a computer network address associated with a repair shop having a client computing device disposed at the computer network address to display content of a scheduler application served by the computing server, and (iv) transmit, to the client computing device disposed at the computer network address associated with the repair shop, a second computer network transmission comprising data to cause the client computing device to display as part of the content of the scheduler application served by computing server an alert indicator and parsed data indicative of the vehicle and the parsed data indicative of the vehicle condition of the vehicle reported by the vehicle.

Viewed from yet another aspect, an example embodiment takes the form of a computer readable medium configured to store at least executable instructions, wherein the executable instructions, when executed by a processor of a computing device, cause the computing device to perform functions comprising: (i) receiving a first computer network transmission comprising data indicative of a vehicle and data indicative of a vehicle condition of the vehicle reported by the vehicle, (ii) parsing the first computer network transmission to obtain the data indicative of the vehicle and the data indicative of the vehicle condition of the vehicle reported by the vehicle, (iii) determining, based on the data indicative of the vehicle, a computer network address associated with a repair shop having a client computing device disposed at the computer network address to display content of a scheduler application served by the computing server, and (iv) transmitting, to the client computing device disposed at the computer network address associated with the repair shop, a second computer network transmission comprising data to cause the client computing device to display as part of the content of the scheduler application served by computing server an alert indicator and parsed data indicative of the vehicle and the parsed data indicative of the vehicle condition of the vehicle reported by the vehicle.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 9, FIG. 10, FIG. 11, FIG. 12, FIG. 13, FIG. 14, and FIG. 15 show display outputs in accordance with the example embodiments.

DETAILED DESCRIPTION

I. Introduction

This description describes example embodiments including example embodiments pertaining to a scheduler application. The scheduler application can be referred to as a "vehicle shop scheduler," a "shop scheduler," a "scheduler," or by another term. The scheduler of the example embodiments may enable a shop to improve its management of workflow within the shop including scheduling technician time, service appointments, and shop resources.

The scheduler application can be executed by a computing server. The computing server can transmit network communications comprising data for a client computing device. The computing server can receive data for modifying a schedule from the client computing device. The computing server can receive data reported by a vehicle for modifying a schedule, such as a schedule maintained for a repair shop where the client computing device is located.

II. Example Sysytems

A. Operating Envoirnment

Figure 1:
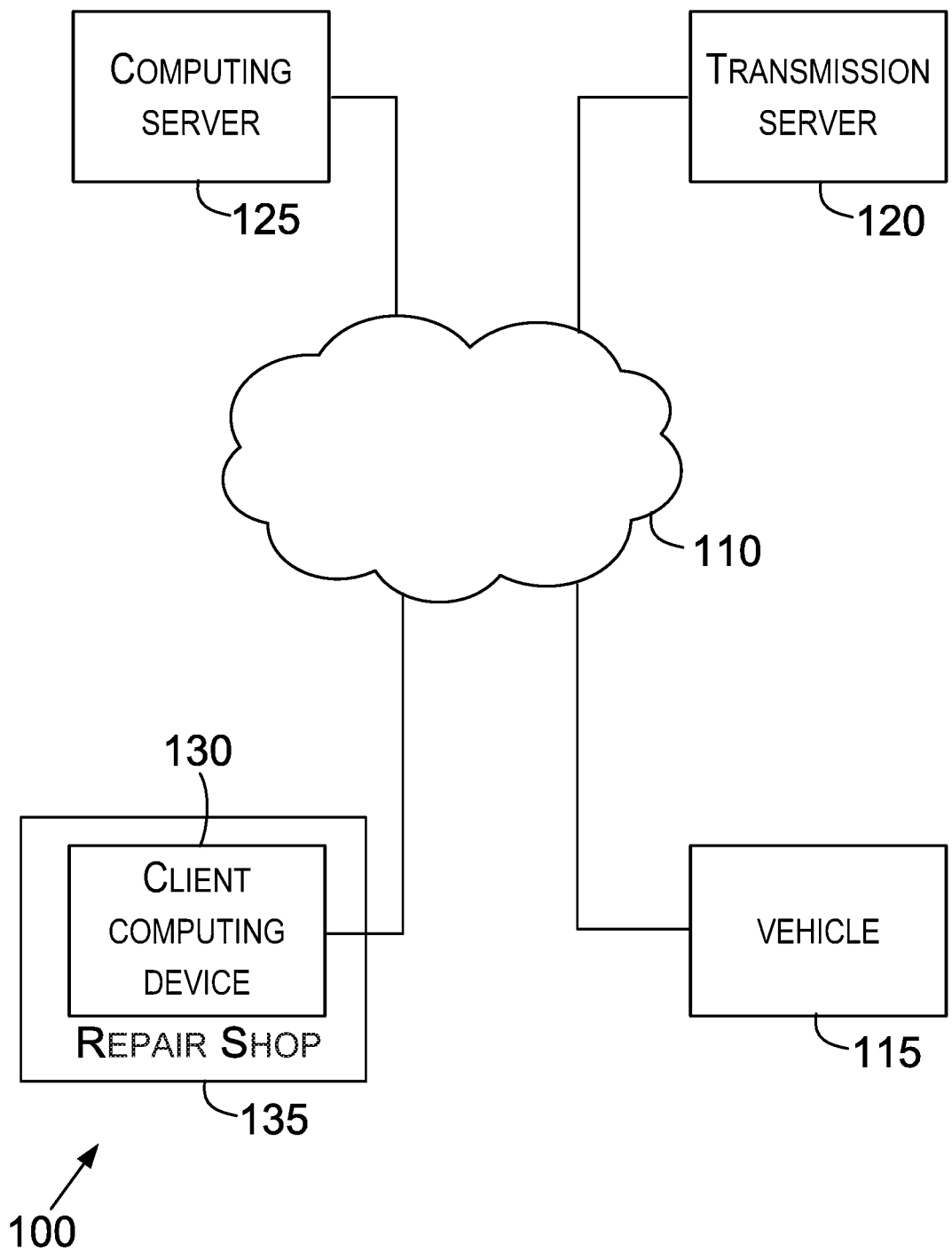
FIG. 1 is a diagram showing an example operating environment in which the example embodiments can operate.

FIG. 1 is a diagram showing an example operating environment 100 in which the example embodiments can operate. The operating environment 100 comprises a computer network 110, a vehicle 115, a transmission server 120, a computing server 125, a client computing device 130, and a repair shop 135.

The computer network 110 can comprise a network link component such as a switch, a modem, a gateway, an antenna, a cable, a transmitter, a receiver, a router, an access point, a wiring hub, or an Ethernet switch to allow devices at various locations of the computer network 110 to connect to one another. The computer network 110 can comprise a wireless communication link, such as a Wi-Fi® communication link, or a wired communication link, such as an Integrated Service Digital Network, a Digital Subscriber Link, a coaxial cable, or a fiber optic cable. The computer network 110 can comprise a wide area network (WAN). The WAN can carry data using one or both of a packet-switched technology and a circuit-switched technology. The WAN can comprise an air interface or wire to carry the data. The computer network 110 can comprise a local area network (LAN) that is connected to other portions of the computer network 110 via the network link component. The computer network 110 can comprise a metropolitan area network (MAN). The computer network 110 carries communications. The computer network 110 can carry communications in accordance with a network protocol. As an example, the network protocol can comprise a protocol such as an Internet Protocol (IP) or a Transmission Control Protocol (TCP). The computer network 110 can comprise a communication network commonly referred to as the Internet.

The repair shop 135 is a facility at which a vehicle can be repaired. As an example, the repair shop 135 can comprise a vehicle transmission repair shop, a manufacturer's dealer repair shop, an independent repair shop, a vehicle oil change repair shop, or some other type of repair shop at which a vehicle may be taken for servicing. A typical repair shop comprises one or more shop tools, such as a vehicle lift, a brake lathe, a wheel alignment machine, a wheel balancer, or a diagnostic computing device for diagnosing a vehicle. The repair shop 135 can comprise a LAN and a network link component to connect that LAN to the computer network 110. The client computing device 130 can operate at, within, or remote from the repair shop 135.

B. Vehicle

Figure 2:
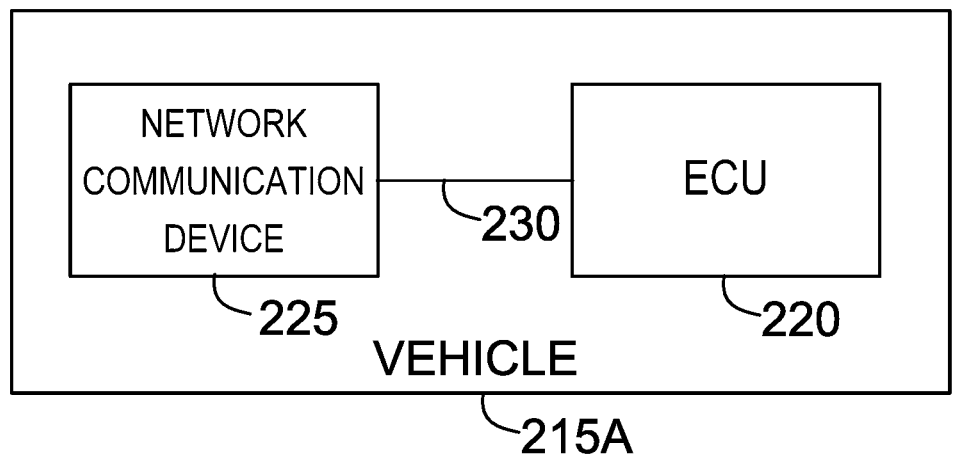
FIG. 2 shows simple block diagrams of vehicles in accordance with the example embodiments.
Figure 2:
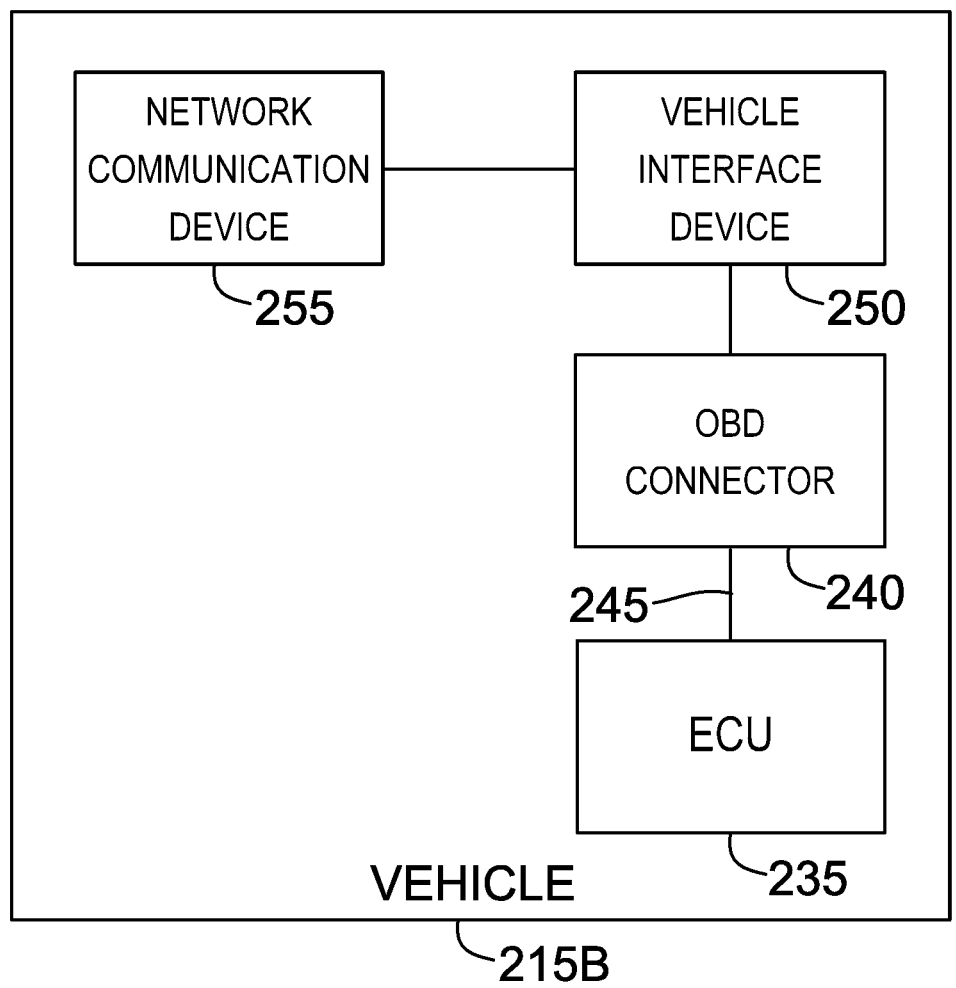

Next, FIG. 2 shows example vehicle 215A and vehicle 215B. A vehicle, such as the vehicle 115, 215A, or 215B, is a mobile machine that can be used to transport a person, people, or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guide at least partially autonomously. In the case of an autonomous vehicle, the vehicle can at least sometimes be guided along a path without any person or cargo inside or on the vehicle. A vehicle, such as a wheeled motor vehicle, can comprise an automobile, a motorcycle, an all-terrain vehicle (ATV) defined by ANSI/SVIA-1-2007, a light-duty truck, a medium-duty truck, a heavy-duty truck, a semi-tractor, a farm machine, a van (such as a dry or refrigerated van), a tank trailer, a platform trailer, or an automobile carrier. A vehicle can comprise a snowmobile or a personal watercraft (e.g., a JET SKI® personal watercraft). A vehicle can comprise or use any appropriate voltage or current source, such as a battery, an alternator, a fuel cell, and the like. A vehicle can comprise or use any desired drive system or engine. That drive system or engine can comprise items that use fossil fuels, such as gasoline, natural gas, propane, and the like, electricity, such as that generated by a battery, magneto, fuel cell, solar cell and the like, wind and hybrids or combinations thereof.

The vehicle 215A comprises an electronic control unit (ECU) 235, a network communication device 225, and a vehicle communication link (VCL) 230. The network communication device 225 is configured to carry out communications over the computer network 110. The network communication device 225 can be connected directly to the ECU 220 via the VCL 230. The network communication device 225 can comprise a network communication device installed into the vehicle 215A by the vehicle manufacturer or an aftermarket source. The network communication device 225 can, for example, connect to the computer network 110 using a cellular network protocol, such as a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a UMTS standard, an enhanced data rates for GSM evolution (EDGE) standard, or a multichannel multipoint distribution service (MMDS) standard. Additionally or alternatively, the network communication device 225 can connect to the computer network 110 using a wireless communication standard or protocol other than a cellular network standard or protocol, such as an Institute of Electrical and Electronics Engineers (IEEE) 802.11 standard (e.g., 802.11a, 802.11b, 802.11g, or 802.11n).

The vehicle 215B comprises an ECU 235, an on-board diagnostic (OBD) connector 240, a vehicle communication link 245 that connects the ECU 235 to the OBD connector 240, a vehicle interface device 250 removably connectable to the OBD connector 240, and a network communication device 255.

An ECU, such as the ECU 220 or the ECU 235, can detect a malfunction in a vehicle and set a diagnostic trouble code (DTC) to an active status. A vehicle, such as the vehicle 115, 215A, or 215B, can be a "connected vehicle" (e.g., a vehicle connected to the computer network).

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a vehicle model with different vehicle options. For example, the particular vehicle model can comprise vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y , where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine (ICE)) within the vehicle. A person skilled in the art will understand that other features in addition to or as an alternative to "engine type" can be used to identify a vehicle using particular vehicle identifying information, and for some purposes, a vehicle could be identified by its make and model M/M. These other features can be identified in various manners, such as a regular production option (RPO) code, such as the RPO codes defined by the General Motors Company LLC, Detroit Michigan. Furthermore, the vehicle identifying information can be combined and displayed as a vehicle identification number (VIN). The VIN can be displayed on a VIN label.

A vehicle communication link (VCL), such as the VCL 230 within the vehicle 215A or the VCL 245 within the vehicle 215B, can comprise one or more conductors (e.g., copper wire conductors) or can be wireless. As an example, a VCL can comprise one or more conductors for carrying vehicle data messages in accordance with a vehicle data message (VDM) protocol. A VDM protocol can comprise a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, local interconnect network (LIN), or some other VDM protocol defined for performing communications over a VCL with or within the vehicle 115, 215A or 215B. Each and every VDM discussed in this description is arranged according to a VDM protocol.

An ECU, such as the ECU 220 or 235, can control various aspects of vehicle operation or components within a vehicle. For example, the ECU 220 or 235 can comprise a powertrain (PT) system ECU, an engine control module (ECM) ECU, a powertrain control module (PCM) ECU, a supplemental inflatable restraint (SIR) system (i.e., an air bag system) ECU, an entertainment system ECU, or some other ECU. The ECU 220 or 235 can receive inputs (e.g., a sensor input), control output devices (e.g., a solenoid), generate a vehicle data message (VDM) (such as a VDM based on a received input or a controlled output), and set a DTC as being active or history for a detected fault or failure condition within a vehicle. The ECU 220 or 235 can perform a functional test can or a reset procedure in response to receiving a VDM requesting performance of the functional test or the reset procedure. A VDM received by the ECU 220 or 235 can comprise a parameter identifier (PID) to request a parameter data value associated with the PID. A VDM transmitted by the ECU 220 or 235 can comprise a response comprising the PID and the PID data value associated with the PID. The ECU 220 or 235 can be connected to a vehicle component, such as a vehicle battery, a sensor, a vehicle chassis, a solenoid, a fuel injector, a fuel pump, or some other vehicle component via a circuit, such as an electrical or optical circuit.

The OBD connector 240 can, for example, comprise an OBD I connector, an OBD II connector, an assembly line diagnostic link (ALDL) connector, or a data link connector (DLC). An OBD I connector can comprise slots for retaining up to twelve connector terminals. An OBD II connector can comprise slots for retaining up to sixteen connector terminals. As an example, the OBD II connector that meets the SAE J1962 specification such as a connector 16M, part number 12110252, available from Delphi Automotive LLP of Troy, Mich. The OBD connector 240 can comprise conductor terminals that connect to a conductor in the vehicle 115, 215A or 215B. For instance, the OBD connector 240 can comprise connector terminals that connect to conductors that respectively connect to positive and negative terminals of a vehicle battery. The OBD connector 240 can comprise one or more conductor terminals that connect to a conductor of the VCL 245 such that the OBD connector 240 is communicatively connected to the ECU 235. The vehicle 215A can comprise an OBD connector, such an OBD connector in parallel with the ECU 220 or the network communication device 225.

The vehicle interface device 250 can comprise a transceiver and a connector that mates with the OBD connector 240. The vehicle interface device 250 can be removably connectable to the OBD connector 240. As an example, a vehicle owner or vehicle user can connect the vehicle interface device 250 to the OBD connector 240 in response to the ECU 235 detecting a vehicle malfunction and causing a malfunction indicator lamp (MIL) to be illuminated in the vehicle 215A. The vehicle interface device 250 is typically removed after the vehicle malfunction has been repaired or after the network communication device 255 has communicated with the transmission server 120. As an example, the vehicle interface device 250 can comprise a ZUBIE® vehicle monitoring device model number GL700C sold by the BEST BUY® retail store, an AUDIOVOX car connection elite monitor sold by the BEST BUY® retail store with SKU 6365119, a GEOTAB® G07® expandable plug-and-play telematics device sold by Geotab, Inc., Oakville, Ontario, Canada. Other examples of the vehicle interface device 250 are also possible.

The vehicle interface device 250 can communicate with the network communication device 255 in various ways. As an example, the vehicle interface device 250 can communicate wirelessly with the network communication device 255. Those wireless communications between the vehicle interface device 250 and the network communication device 255 can be arranged in accordance with one or more wireless communication standards or protocols such as an IEEE standard, such as an IEEE 802.11 standard (e.g., 802.11a, 802.11b, 802.11g, or 802.11n) or an IEEE 802.15 standard (e.g., 802.15.1, 802.15,3, 802.15.4 (ZigBee), or 802.15.5) for wireless personal area networks (PANs), a Bluetooth version 4.1 or 4.2 standard developed by the Bluetooth Special Interest Group (SIG) of Kirkland, Washington, or an IEEE 802.11 standard for wireless LAN (which is sometimes referred to as a Wi-Fi standard), an International Organization for Standardization (ISO/International Electrotechnical Commission (IEC) standard such as the ISO/IEC 18000-3 standard for Near Field Communication (NFC), the Sigfox communication standard, the Neul communication standard, or the LoRaWAN communication standard.

As an example, the network communication device 255 can comprise or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The network communication device 255 can comprise an executable application downloaded to a transceiver of the network communication device 255 from the APP STORE® online retail store, from the GOOGLE PLAY® online retail store, or another source of an application or the CRPI executable by the network communication device 255.

As another example, the vehicle interface device 250 and the network communication device 255 can be co-located in a single casing. In accordance with this example, the vehicle interface device 250 and the network communication device 255 can be communicatively coupled via a wired circuit such as a system bus or a printed circuit. The network communication device 255 can connect to the computer network 110 in any of the ways in which the network communication device 225 is described as connecting the computer network 110.

C. Transmission Server

Figure 3:
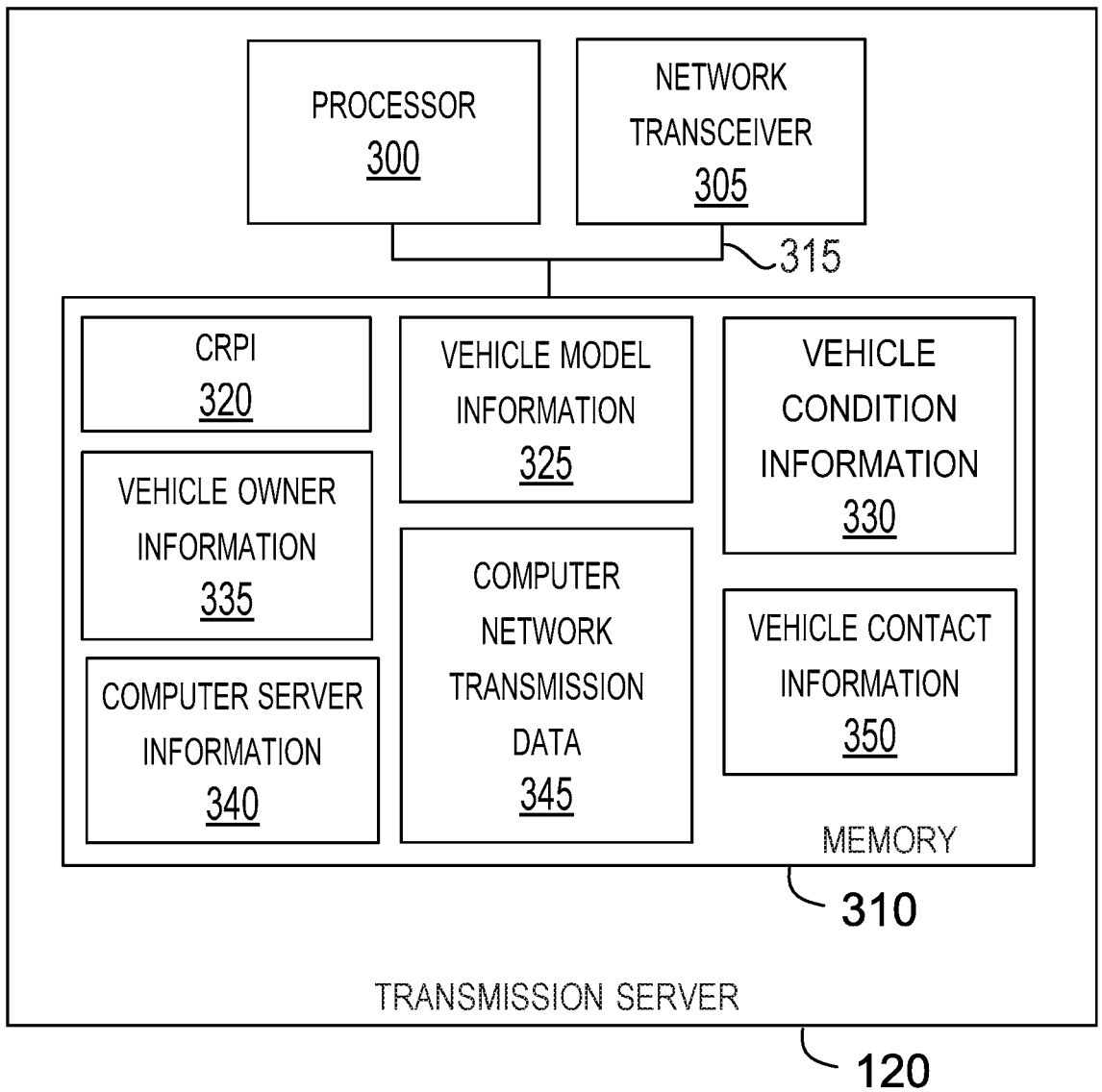
FIG. 3 is a simple block diagram of a server in accordance with the example embodiments.

Next, FIG. 3 is a simple block diagram of the transmission server 120 in accordance with an example embodiment. As shown in FIG. 3, the transmission server 120 comprises a processor 300, a network transceiver 305, and a 310. Two or more of the aforementioned components shown in FIG. 3 may be communicatively coupled or linked together via a system bus, network, or other connection mechanism 315. The transmission server 120 can comprise a component of the computing device 1600 shown in FIG. 16. The transmission server 120 can comprise a component of the computer program product 1700 shown in FIG. 17.

The memory 310 comprises CRPI 320, vehicle model information 325, vehicle condition information 330, vehicle owner information 335, computing server information 340, computer network transmission data 345, and vehicle contact information 350. The CRPI 320 comprise programs instruction executable by the processor 500.

1. Processor

A processor, such as the processor 300 or any other processor (e.g., a processor 400 or a processor 500) discussed in this description or comprised within a device or system described in this description, may comprise one or more processors, such as one or more general purpose processors (e.g., an INTEL® single core microprocessors or an INTEL® multicore microprocessors) or one or more special purpose processors (e.g., a digital signal processor, a graphics processor, an embedded processor, or an application specific integrated circuit (ASIC) processor). A graphics processor may be configured to access and use a memory for creating, or retrieving GUI to display on a display. An embedded processor can comprise a central processing unit chip used in a system that is not a general-purpose workstation, laptop, or desktop computer. A processor may be configured to execute computer-readable program instructions (CRPI) stored in a memory. A processor may be configured to execute hard-coded functionality in addition to or as an alternative to software-coded functionality (e.g., via CRPI).

2. Network Transceiver

The network transceiver, such as the network transceiver 305 or any other network transceiver (e.g., a network transceiver 505) discussed in this description or comprised within a device or system described in this description, may comprise one or more network transceivers. Each network transceiver comprises one or more transmitters configured to transmit data or a communication onto a computer network, such as the computer network 110. The network transceiver 305 can transmit any data or computer network transmission discussed as being transmitted, output, or provided by the transmission server 120 or the network transceiver 305. Each network transceiver (e.g., the network transceiver 305, 1610 or 505) comprises one or more receivers configured to receive data or a computer network transmission carried over a computer network, such as the computer network 110.

The network transceiver 305 can receive any data or computer network transmission discussed as being received by the transmission server 120 or the network transceiver 305.

Each network transceiver can comprise a wireless transceiver to communicate with a separate wireless transceiver or wireless receiver. A transmitter, such as a transmitter in the network transceiver 305, or 505, can transmit a radio signal carrying data or a computer network transmission, and a receiver, such as a receiver in the network transceiver 305 or 505, can receive a radio signal carrying data or a computer network transmission. A transceiver with a radio transmitter and radio receiver can comprise one or more antennas and can be referred to as a "radio transceiver," an "RF transceiver," or a "wireless transceiver."

A radio signal transmitted or received by a radio transceiver can be arranged in accordance with one or more wireless communication standards or protocols such as an IEEE standard, such as (i) an IEEE 802.11 standard for wireless LAN (which is sometimes referred to as a Wi-Fi standard) (e.g., 802.11a, 802.11b, 802.11g, or 802.11n), (ii) an IEEE 802.15 standard (e.g., 802.15.1, 802.15,3, 802.15.4 (ZigBee), or 802.15.5) for wireless personal area networks (PANs), (iii) a Bluetooth version 4.1 or 4.2 standard developed by the Bluetooth Special Interest Group (SIG) of Kirkland, Wash., (iv) a cellular wireless communication standard such as an LTE standard, (v) a CDMA standard, (vi) an DEN standard, (vii) a GSM standard, (viii) a GPRS standard, (ix) a UMTS standard, (x) an EDGE standard, (xi) a MMDS standard, (xii) an ITU standard, such as the ITU-T G.9959 standard referred to as the Z-Wave standard, (xiii) a 6LoWPAN standard, (xiv) a Thread networking protocol, (xv) an ISO/IEC standard such as the ISO/IEC 18000-3 standard for NFC, (xvi) the Sigfox communication standard, (xvii) the Neul communication standard, or (xviii) the LoRaWAN communication standard. Other examples of the wireless communication standards or protocols are possible.

Additionally or alternatively, a transmitter, such as a transmitter in the network transceiver 305 or 505, can transmit a signal (e.g., one or more signals or one or more electrical waves) carrying or representing data or a communication onto a wire (e.g., one or more wires) and a receiver, such as a receiver in the network transceiver 305 or 505, can receive via a wire a signal carrying or representing data or a communication over the wire. The wire can be part of a computer network, such as the computer network 110. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data or communication transmitted by a network transceiver, such as the network transceiver 305 or 505, can comprise a destination identifier or address of a network device to which the data or communication is to be transmitted. The data or communication transmitted by a network transceiver can comprise a source identifier or address of the system component including the network transceiver. The source identifier or address can be used to send a response to the network device that comprises the network transceiver that sent the data or communication.

A network transceiver that is configured to carry out communications over the computer network 110, such as the network transceiver 305 or 505, can comprise at least one of the following: a modem, a network interface card, or a chip mountable on a circuit board.

As an example the chip can comprise a CC3100 Wi-Fi® network processor available from Texas Instruments, Dallas, Tex., a CC256MODx Bluetooth® Host Controller Interface (HCl) module available from Texas instruments, or a different chip for communicating via Wi-Fi®, Bluetooth® or another communication protocol.

A device within or coupled to the computer network 110 or that communicates via the computer network 110 using a packet-switched technology can be locally configured for a next 'hop' in the network (e.g., a device or address where to send data to, and where to expect data from). As an example, a device (e.g., a transceiver) configured for communicating using an IEEE 802.11 standard can be configured with a network name, a network security type, and a password. Some devices auto-negotiate this information through a discovery mechanism (e.g., a cellular phone technology).

3. Memory

A memory, such as the memory 310 or any other memory (e.g., a memory 410 or a memory 510) discussed in this description, can comprise one or more memories. Any memory discussed in this description can thus be referred to as least one memory or one or more memories. A memory can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can comprise a volatile or non-volatile storage component, such as an optical, magnetic, organic or other memory or disc storage component. Additionally or alternatively, a non-transitory memory can comprise or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can comprise static RAM or dynamic RAM. A transitory memory can comprise, for example, CRPI provided over a communication link, such as the computer network 110.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For a memory comprising multiple memories, two or more of the multiple memories can be the same type of memory or different types of memories.

The CRPI 320 can comprise program instructions executable by the processor 300 to carry out any one or more functions described herein or represented by the figures as being performed, at least in part, by the transmission server 120 or a component of the transmission server 120. In general, CRPI, such as the CRPI 320 or any other CRPI (e.g., CRPI 420 or CRPI 530) described herein, comprise program instructions executable by a processor. Further, and in general, CRPI may comprise various structures, modules, routines, or some other computer-readable logic. Further still, and in general, CRPI may be written using a computer-programming language such as C++ or some other programming language.

The CRPI 320 can comprise program instructions to receive CNT via the computer network 110 and parse the received CNT to obtain data contained within the received CNT. The data contained within the received CNT can comprise vehicle model information that the processor 300 causes to be stored in the vehicle model information 325, vehicle owner information that the processor 300 causes to be stored in the vehicle owner information 335, or vehicle condition information that the processor 300 causes to be stored in the vehicle condition information 330.

The vehicle model information 325 can comprise a variety of data regarding a vehicle. As an example, the vehicle model information 325 can comprise any of the vehicle model information 925 shown in FIG. 9, the vehicle model information 1025 shown in FIG. 10, or the vehicle model information 1110 shown in FIG. 11.

The vehicle condition information 330 can comprise a variety of data regarding an operating condition of a vehicle. As an example, the vehicle condition information 330 can comprise a DTC identifier reported by an ECU within a vehicle, or a PID and PID data value associated with the PID from an ECU within the vehicle. As another example, the vehicle condition information 330 can comprise a vehicle condition regarding the vehicle reported via a user comment contained in a computer network transmission.

The vehicle owner information 335 can comprise data regarding a vehicle owner. As an example, the vehicle owner information 335 can comprise any of the vehicle owner information 920 shown in FIG. 9, the vehicle model information shown in FIG. 10, or the vehicle owner information 1105 shown in FIG. 11.

The computing server information 340 can comprise data regarding a computing server, such as the computing server 125. As an example, the computing server information 340 can comprise data (e.g., an IP address and port of the computing server 125) the processor 300 uses to determine where to send a CNT so that the computing server can alert a repair shop regarding a vehicle condition. The data regarding a computing server can be associated with vehicle owner information or vehicle model information associated with the vehicle.

Figure 6:
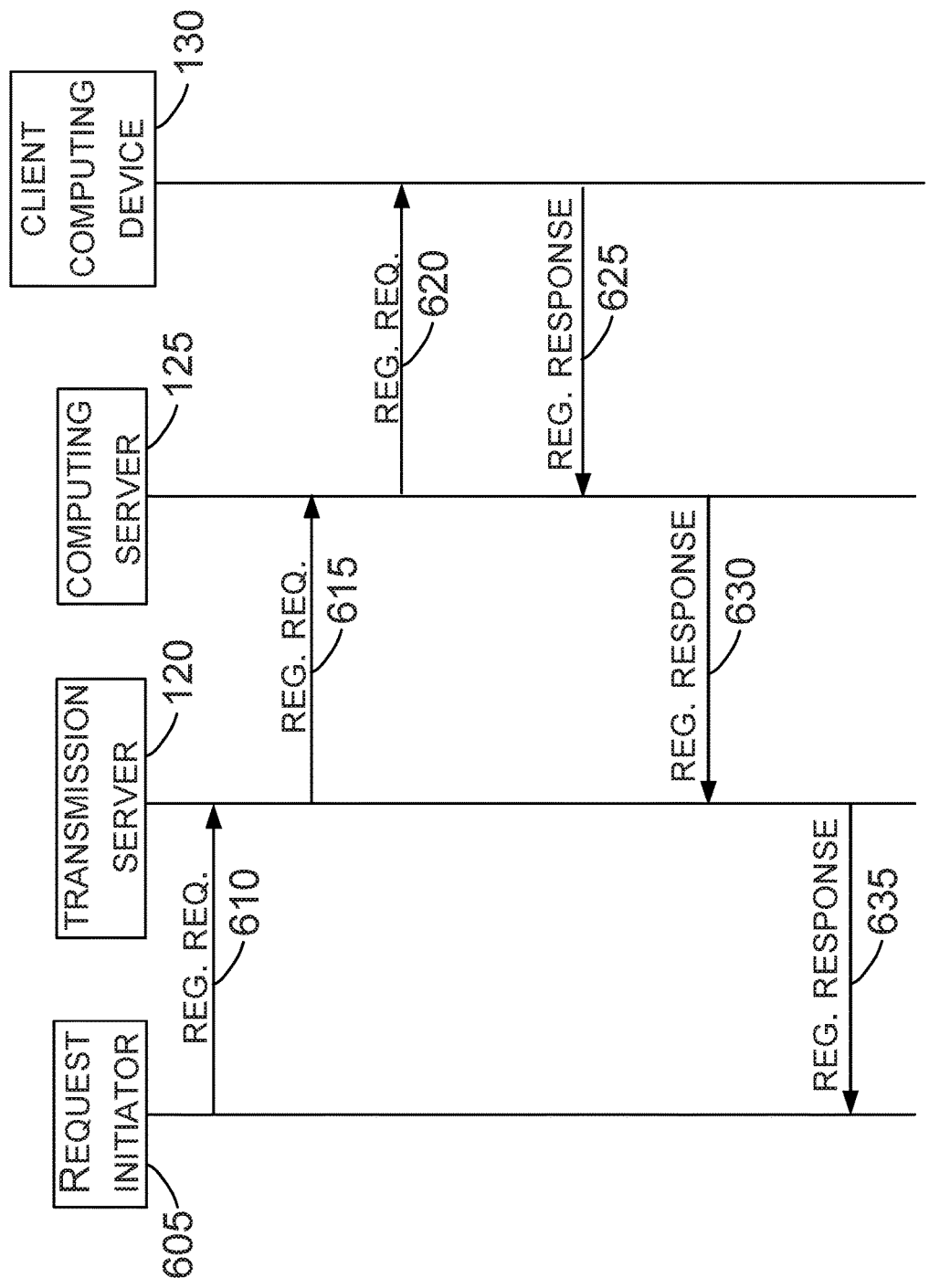
FIG. 6 and FIG. 7 depict a communication flow in accordance with the example embodiments.
Figure 7:
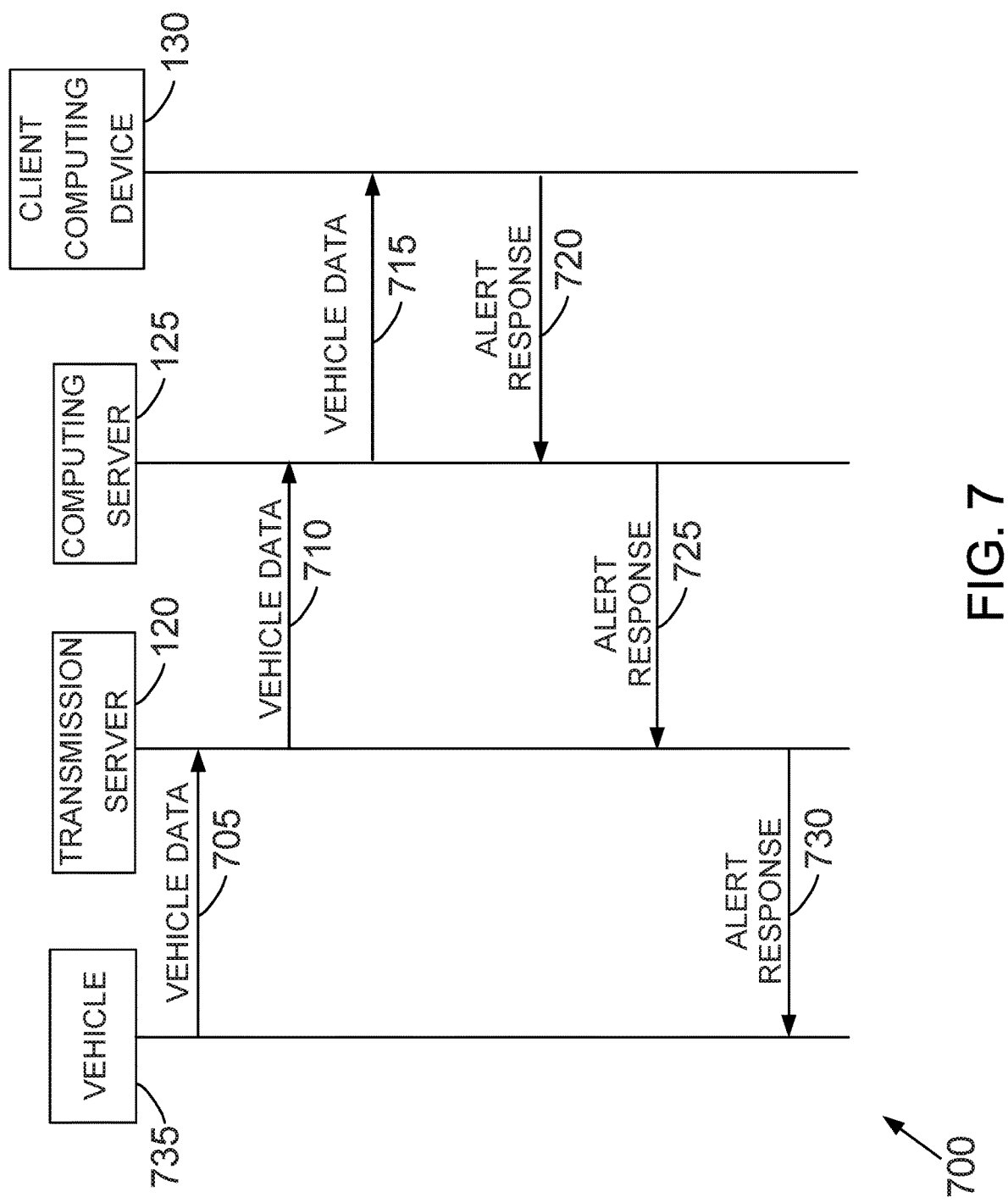

The computer network transmission data 345 can comprise data of a CNT received by the transmission sever 120, which can comprise data contained within an example CNT 610 or CNT 630 shown in FIG. 6, or an example CNT 705 or 725 shown in FIG. 7. The computer network transmission data 345 can comprise data of a CNT to be transmitted by the transmission server 120, which can comprise data contained within an example CNT 615 or 635 shown in FIG. 6, or an example CNT 710 or 730 shown in FIG. 7. In other words, computer network transmission data 345 can comprise data selected from vehicle owner information, vehicle model information, or vehicle condition information.

The vehicle contact information 350 can comprise data the processor 300 uses to determine where to send a CNT to the vehicle, such as an IP address of the network communication device 225 or 255. The vehicle contact information for a vehicle can be associated with vehicle owner information or vehicle model information associated with the vehicle.

Figure 4:
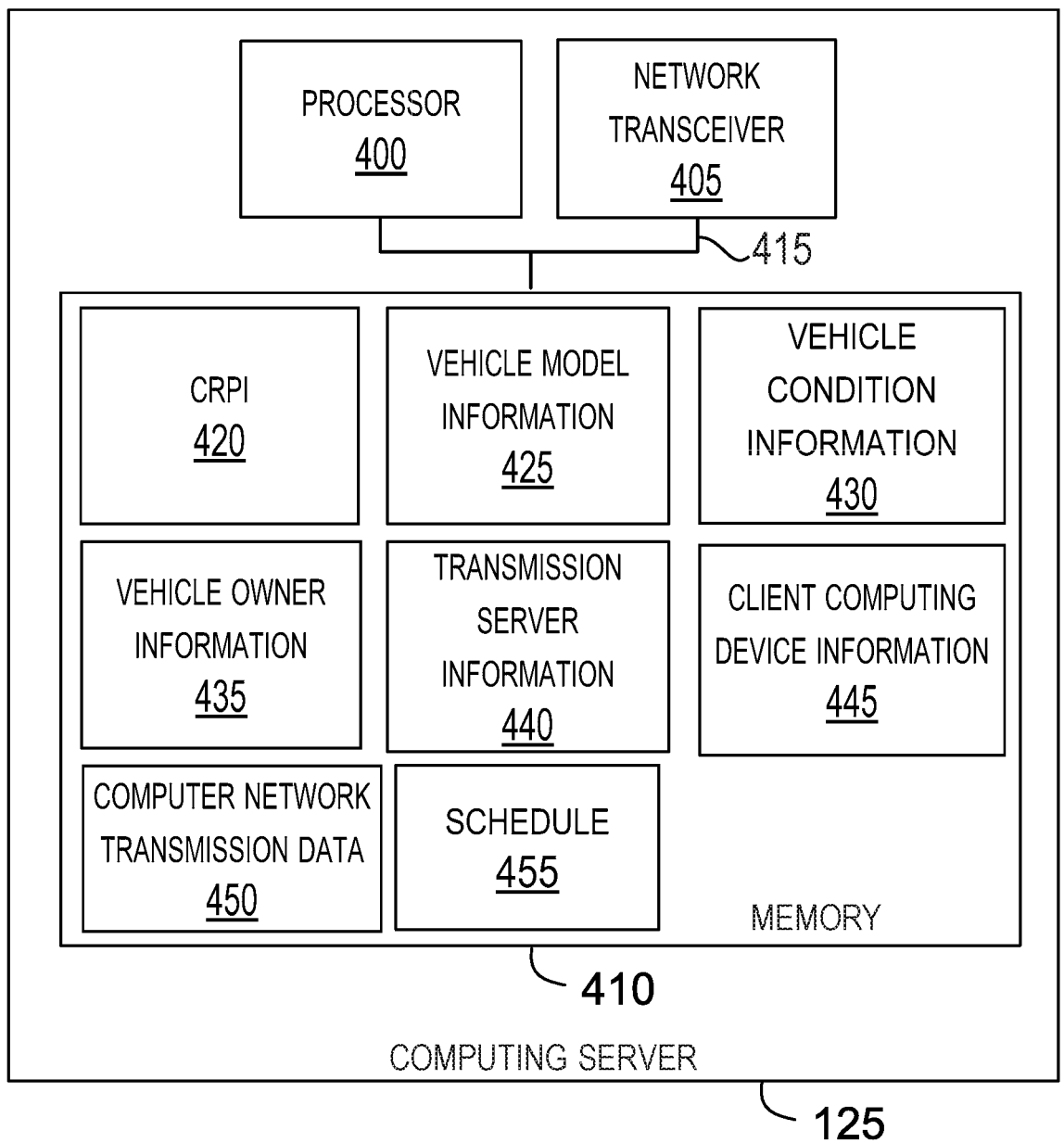
FIG. 4 is a simple block diagram of another server in accordance with the example embodiments.

Next, FIG. 4 is a simple block diagram of the computing server 125 in accordance with an example embodiment. As shown in FIG. 4, the computing server 125 comprises the processor 400, the network transceiver 405, and the memory 410. Two or more of the aforementioned components shown in FIG. 4 may be communicatively coupled or linked together via a system bus, network, or other connection mechanism 415. Aspects regarding the processor 400, the network transceiver 405, and the memory 410 are discussed above. The computing server 125 can comprise a component of the computing device 1600 shown in FIG. 16. The computing server 125 can comprise a component of the computer program product 1700 shown in FIG. 17.

The memory 410 can comprise CRPI 420, vehicle model information 425, vehicle condition information 430, vehicle owner information 435, transmission server information 440

The CRPI 420 can comprise program instructions executable by the processor 400 to carry out any one or more functions described herein or represented by the figures as being performed, at least in part, by the computing server 125 or a component of the computing server 125.

The CRPI 420 can comprise program instructions to receive CNT via the computer network 110 and parse the received CNT to obtain data contained within the received CNT. The data contained within the received CNT can comprise vehicle model information that the processor 400 causes to be stored in the vehicle model information 425, vehicle owner information that the processor 400 causes to be stored in the vehicle owner information 435, or vehicle condition information that the processor 400 causes to be stored in the vehicle condition information 430.

The vehicle model information 425 can comprise a variety of data regarding a vehicle.

Figure 9:
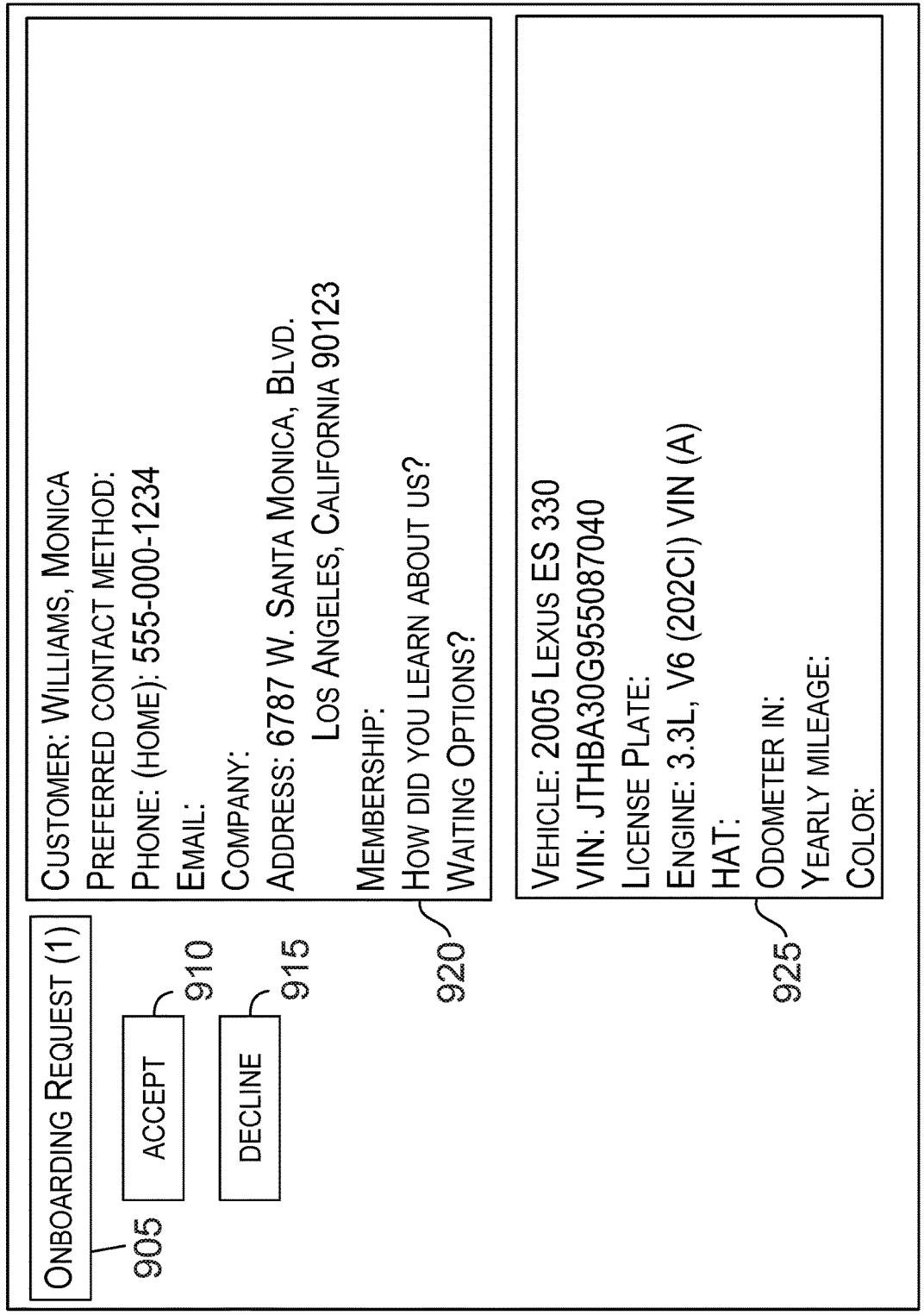
Figure 10:
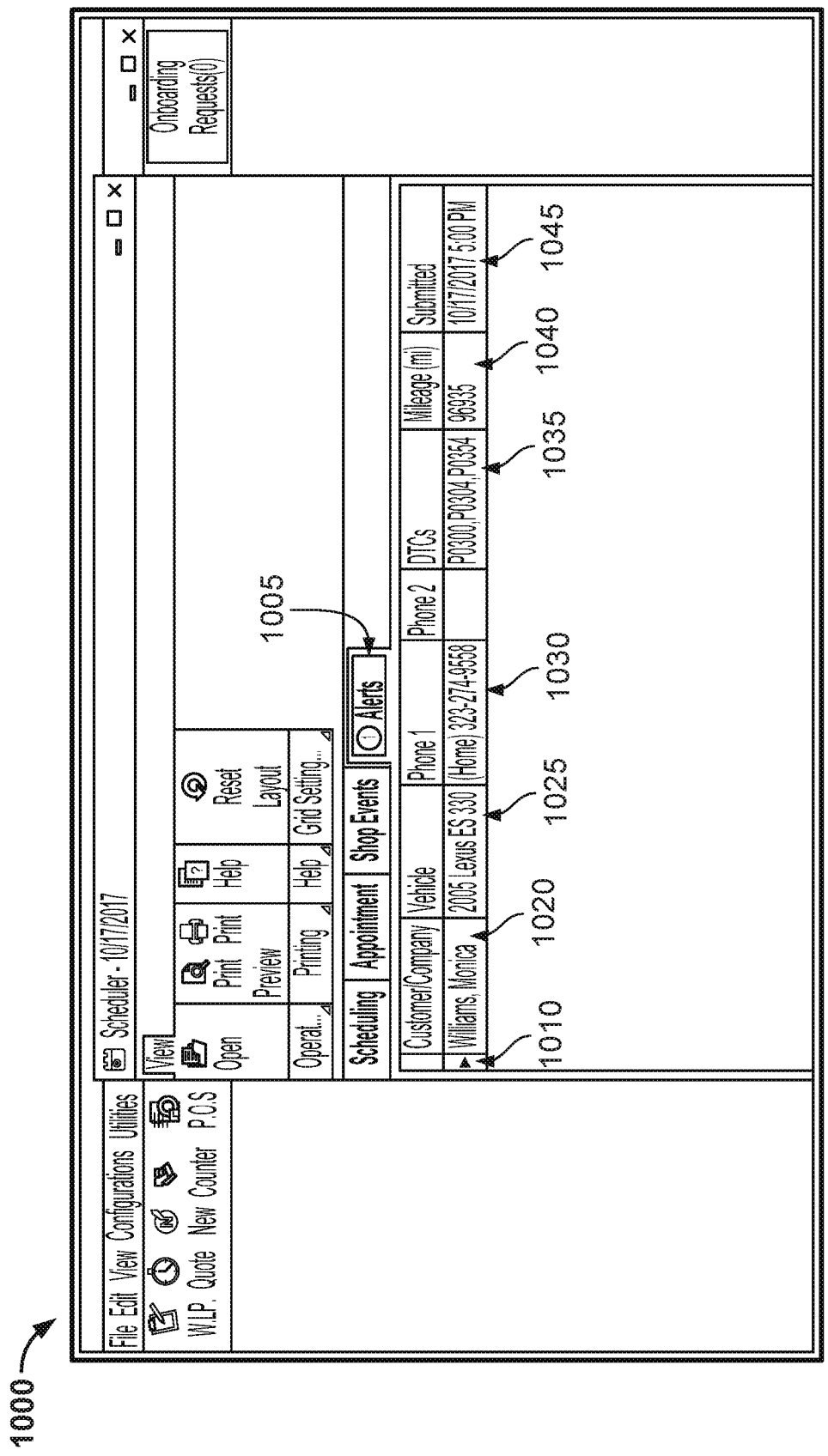
Figure 11:
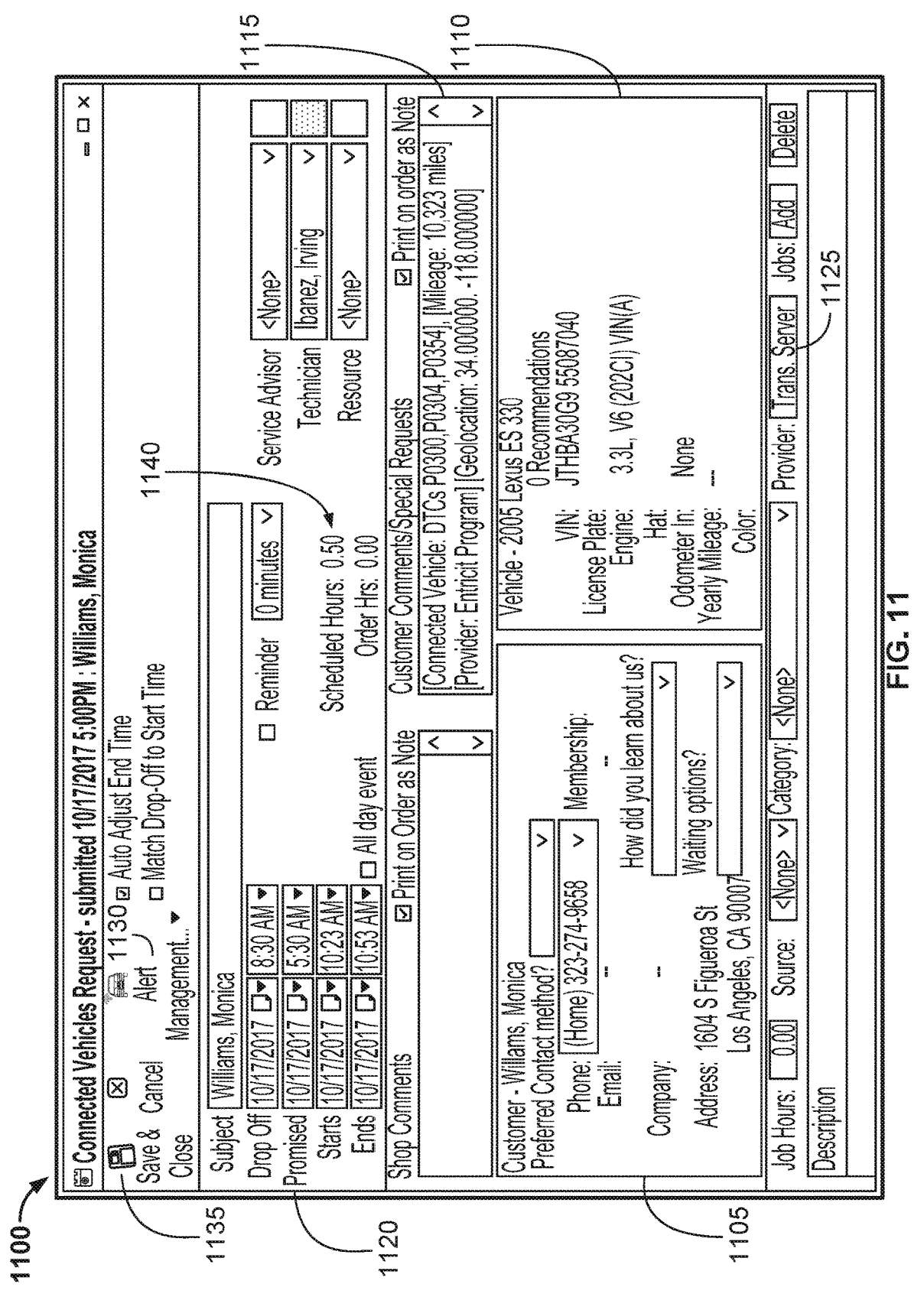

As an example, the vehicle model information 425 can comprise any of the vehicle model information 925 shown in FIG. 9, the vehicle model information 1025 shown in FIG. 10, or the vehicle model information 1110 shown in FIG. 11.

The vehicle condition information 430 can comprise a variety of data regarding an operating condition of a vehicle. As an example, the vehicle condition information 430 can comprise a DTC identifier reported by an ECU within a vehicle, or a PID and PID data value associated with the PID from an ECU within the vehicle. As another example, the vehicle condition information 430 can comprise a vehicle condition regarding the vehicle reported via a user comment contained in a computer network transmission.

The vehicle owner information 435 can comprise data regarding a vehicle owner. As an example, the vehicle owner information 435 can comprise any of the vehicle owner information 920 shown in FIG. 9, the vehicle model information shown in FIG. 10, or the vehicle owner information 1105 shown in FIG. 11.

The transmission server information 440 can comprise data regarding a transmission server that communicates with the computing server 125, such as the transmission server 120. As an example, the transmission server information 440 can comprise data (e.g., an IP address and port of the transmission server 120) the processor 400 uses to determine where to send a CNT so that the computing server 125 can send a response to the transmission server, such as a registration request or alert response. The data regarding a transmission server can be associated with vehicle owner information or vehicle model information associated with the vehicle.

The client computing device information 445 can comprise data the processor 400 uses to determine where to send a CNT destined for the client computing device 130, such as an IP address of the client computing device 130. The client computing device information 445 can be associated with vehicle owner information or vehicle model information associated with the vehicle identified in a CNT the computing server 125 receives from the transmission sever 120.

The computer network transmission data 450 can comprise data of a CNT received by the computing server 125, which can comprise data contained within an example CNT 615 or CNT 625 shown in FIG. 6, or an example CNT 710 or 720 shown in FIG. 7. The computer network transmission data 450 can comprise data of a CNT to be transmitted by the computing server 125, which can comprise data contained within an example CNT 620 or 630 shown in FIG. 6, or an example CNT 715 or 725 shown in FIG. 7. In other words, computer network transmission data 450 can comprise data selected from vehicle owner information, vehicle model information, or vehicle condition information.

The schedule 455 can comprise a schedule the computing server 125 generates, maintains, and provides to the client computing device 130 for the repair shop 135. As an example, the schedule 455 can comprise any of the following schedule data: regular business hours data, holiday setup data, appointment data, appointment state data, shop resource usage data, technician setup data, employee data, calendar data, or customer data. The customer data can comprise the vehicle condition data reported by the customer's vehicle. The schedule 455 can comprise schedules for multiple repair shops.

Figure 5:
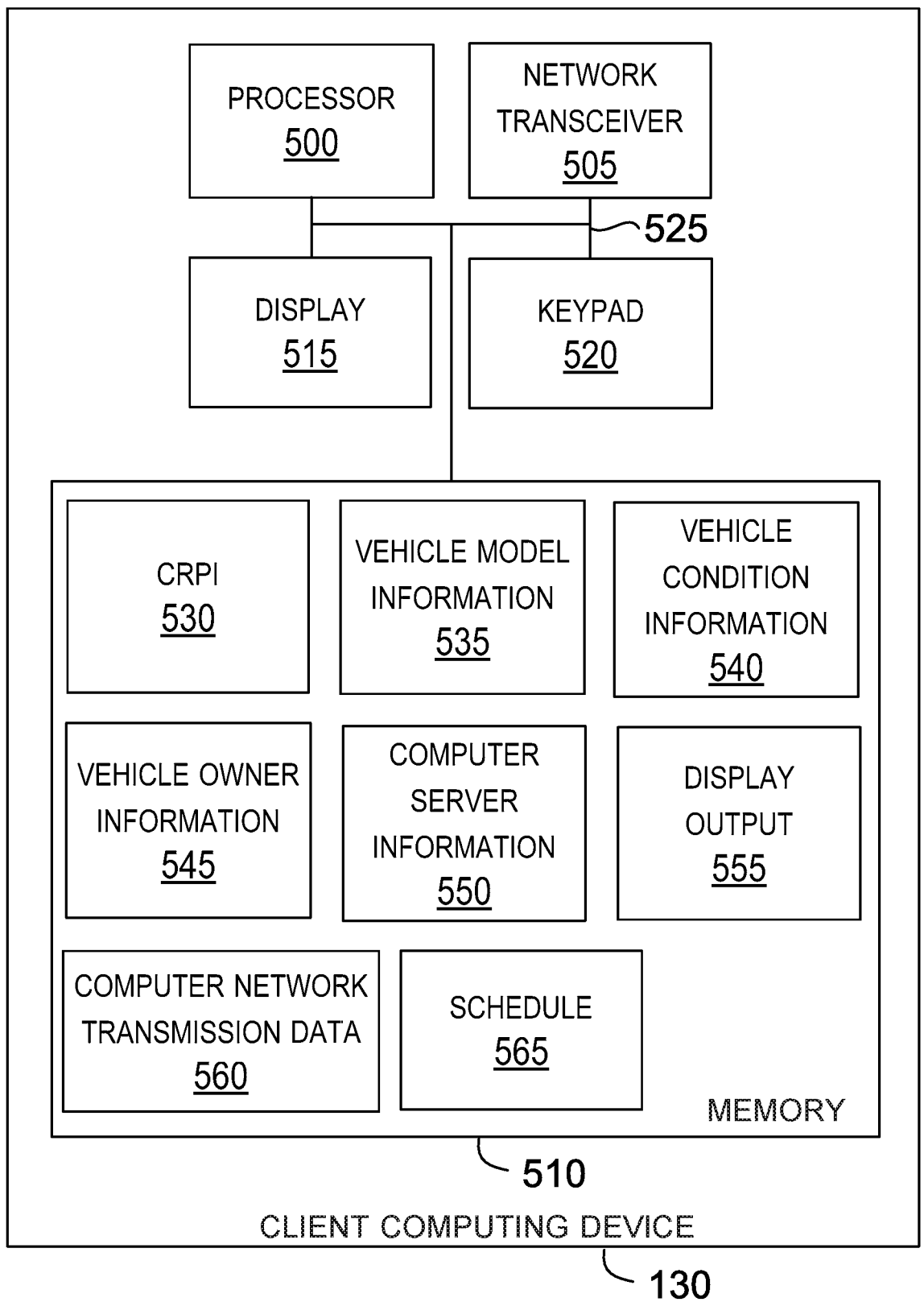
FIG. 5 is a simple block diagram of a client computing device in accordance with the example embodiments.

Next, FIG. 5 is a simple block diagram of the client computing device 130 in accordance with an example embodiment. As shown in FIG. 5, the client computing device 130 comprises the processor 500, the network transceiver 505, the memory 510, a display 515, and a keypad 520. Two or more of the aforementioned components shown in FIG. 5 can be communicatively coupled or linked together via a system bus, network, or other connection mechanism 525. Aspects regarding the processor 500, the network transceiver 505, and the memory 510 are discussed above. The client computing device 130 can comprise a component of the computing device 1600 shown in FIG. 16. The client computing device 130 can comprise a component of the computer program product 1700 shown in FIG. 17.

The memory 510 comprises CRPI 530, vehicle model information 535, vehicle condition information 540, vehicle owner information 545, computing server information 550, a display output 555, and computer network transmission data 560. The CRPI 530 comprise programs instruction executable by the processor 500.

As an example, the client computing device 130 can comprise, or can be configured as, a desktop computing system, such as an OptiPlex® 9020 Mini Tower desktop computing system available from Dell Computer Corporation, Austin, Tex., or some other desktop computing system. The client computing device 130 can comprise, or can be configured as, a laptop computing system, such as the Dell Chromebook desktop computing system available from Dell Computer Corporation, or some other laptop computing system.

As an example, the client computing device 130 can comprise, or can be configured as, a smartphone (e.g., an example smartphone listed above). As another example, the client computing device 130 can comprise, or can be configured as, a tablet device (e.g., an example table device listed above).

The display 515 can comprise one or more displays. As an example, the display 515 can comprise a capacitive touch display, a resistive touch display, a plasma display, a light emitting diode (LED) display, a cathode ray tube display, an organic light-emitting diode (OLED) display, such as an active-matrix OLED or a passive-matrix OLED, or a backlit color liquid crystal display (LCD) having a resistive touch or panel. Data or selections can be entered at the client computing device 130 by way of a stylus in contact with the display 515.

The keypad 520 can comprise a keyboard or a pointing device. The keyboard can comprise, or can be configured as, a wired or wireless QWERTY keyboard or some other keyboard for entering data or selections into the client computing device 130. The pointing device can comprise, or can be configured as, a wired or wireless computer mouse. As an example, the keypad 520 can select an accept selector 810 (shown in FIG. 8) or a decline selector 815 (shown in FIG. 8). Data or selections may be entered at the client computing device 130 in other ways as well.

The CRPI 530 can comprise program instructions executable by the processor 500 to carry out any one or more functions described herein or represented by the figures as being performed, at least in part, by the client computing device 130 or a component of the client computing device 130.

The CRPI 530 can comprise program instructions to receive CNT via the computer network 110 and parse the received CNT to obtain data contained within the received CNT. The data contained within the received CNT can comprise vehicle model information that the processor 500 causes to be stored in the vehicle model information 535, vehicle owner information that the processor 500 causes to be stored in the vehicle owner information 545, or vehicle condition information that the processor 500 causes to be stored in the vehicle condition information 540.

The vehicle model information 535 can comprise a variety of data regarding a vehicle. As an example, the vehicle model information 535 can comprise any of the vehicle model information 925 shown in FIG. 9, the vehicle model information 1025 shown in FIG. 10, or the vehicle model information 1110 shown in FIG. 11.

The vehicle condition information 540 can comprise a variety of data regarding an operating condition of a vehicle. As an example, the vehicle condition information 540 can comprise a DTC identifier reported by an ECU within a vehicle, or a PID and PID data value associated with the PID from an ECU within the vehicle. As another example, the vehicle condition information 540 can comprise a vehicle condition regarding the vehicle reported via a user comment contained in a computer network transmission.

The vehicle owner information 545 can comprise data regarding a vehicle owner. As an example, the vehicle owner information 545 can comprise any of the vehicle owner information 920 shown in FIG. 9, the vehicle model information shown in FIG. 10, or the vehicle owner information 1105 shown in FIG. 11.

The computing server information 550 can comprise data the processor 500 uses to determine where to send a CNT destined for the computing server 125, such as an IP address of the computing server 125. The computing server information 550 can comprise the address information contained within a CNT the client computing device 130 receives from the computing server 125.

The display output 555 can comprise the data populated in each display output shown in any of the figures. Each display output can comprise a graphical user interface (GUI). Each display output can comprise an hyper-text markup language browser page transmitted to the client computing device 130 from the computing server 125.

The computer network transmission data 560 can comprise data of a CNT received by the client computing device 130, which can comprise data contained within an example CNT 620 shown in FIG. 6, or an example CNT 715 shown in FIG. 7. The computer network transmission data 560 can comprise data of a CNT to be transmitted by the client computing device 130, which can comprise data contained within an example CNT 625 shown in FIG. 6, or an example CNT 720 shown in FIG. 7. In other words, computer network transmission data 560 can comprise data selected from vehicle owner information, vehicle model information, or vehicle condition information.

The schedule 565 can comprise any portion of the schedule 455 stored in the computing server 125 that the computing server transmits to the client computing device 130 and that the client computing device 130 stores. The schedule 565 may include a single output display (e.g., a single page) of the schedule maintained for the repair shop 135. Alternatively, the schedule may include multiple output displays of the schedule maintained for the repair shop 135. The keypad 520 can be used to cycle through the multiple output displays stored in the schedule 565.

III. Example Computer Network Transmission Flows

Next, FIG. 6 is a diagram of an example computer network transmission flow 600 performed by a request initiator 605, the transmission server 120, the computing server 125 and the client computing device 130. The request initiator 605 can comprise the vehicle 115, 2215A, or 2215B, the network communication device 225 or 255, or another computing device (not shown) connectable to the computer network 110, such as a smart phone, a tablet device, a desk top computer or some other computing device that can communicate over the computer network 110. The computer network transmission flow 600 comprises a computer network transmission (CNT) 610, a CNT 615, a CNT 620, a CNT 625, a CNT 630, and a CNT 635.

The CNT 610 comprises a registration request sent by the request initiator 605 to the transmission server 120. The registration request of the CNT 610 can comprise information regarding a vehicle, information regarding a vehicle owner, and an identifier of the repair shop 135. The CNT 615 comprises a registration request sent by the transmission server 120 to the computing server 125. The registration request of the CNT 615 can comprise the information regarding the vehicle, the information regarding the vehicle owner, and the identifier of the repair shop 135 that are contained within the CNT 610. The registration request of the CNT 620 can comprise the information regarding the vehicle and the information regarding the vehicle owner that are contained within the CNT 610 and the CNT 615.

The CNT 625 comprises a response to the registration request sent by the client computing device 130 to the computing server 125. The CNT 630 comprises a response to the registration request sent by the computing server 125 to the transmission server 120. The CNT 635 comprises a response to the registration request sent by the transmission server 120 to the request initiator 605. The response to the registration request in each of the CNT 625, 630, and 635 can indicate the registration request is accepted or the registration request is declined.

Next, FIG. 7 is a diagram of an example computer network transmission flow 700 performed by a vehicle 735, the transmission server 120, the computing server 125 and the client computing device 130. The computer network transmission flow 700 comprises a computer network transmission (CNT) 705, a CNT 710, a CNT 715, a CNT 720, a CNT 725, and a CNT 730. The CNT 705 is transmitted by the vehicle 115 to the transmission server 120 and the CNT 730 is transmitted by the transmission server 120 to the vehicle 115. The vehicle 735 represents any example vehicle described in this description or shown in the figures. Accordingly, the CNT 705 transmitted by the vehicle 735 can be transmitted by the network communication device 225 or 255, and the CNT 730 can be received by the network communication device 225 or 255.

The CNT 705 comprises vehicle data reported by the vehicle 735. The vehicle data reported by the vehicle 735 can comprise vehicle condition information. The vehicle data reported by the vehicle 735 can, for example, comprise a DTC identifier reported by an ECU within the vehicle 735, or a PID and PID data value associated with the PID. The CNT 705 can comprise other data for reporting in an alert to the client computing device 130, such as vehicle owner information and/or vehicle model information.

The CNT 710 comprises vehicle data reported by the vehicle 735. The transmission server 120 can determine that the vehicle data reported by the vehicle 735 is to be transmitted to the computing server 125. That determination can, for example, be based on the vehicle owner indicated by the vehicle owner information or the vehicle identified by the vehicle model information being associated with the computing server 125, the client computing device 130, or the repair shop 135 as a result of a registration request of that vehicle owner or vehicle.

The CNT 715 comprises vehicle data reported by the vehicle 735. The computing server 125 can determine that the vehicle data reported by the vehicle 735 is to be transmitted to the client computing device 130. That determination can, for example, be based on the vehicle owner indicated by the vehicle owner information or the vehicle identified by the vehicle model information being associated with the client computing device 130 or the repair shop 135 as a result of a registration request of that vehicle owner or vehicle. The client computing device 130 can display a display output, such as the display output 1000, comprising an alert in response to receiving the CNT 715.

The CNT 720, the CNT 725, and the CNT 730 comprise an alert response. The client computing device 130 transmits the CNT 720 to the computing server 125. The computing server 125 transmits the CNT 725 to the transmission server 120. The transmission server 120 transmits the CNT 730 to the vehicle 735. The alert response of the CNT 720, the CNT 725, or the CNT 730 can comprise data indicating the repair shop received the vehicle data the vehicle transmitted via the CNT 705. The data within the alert response of the CNT 720, the CNT 725, or the CNT 730 can indicate the repair shop will contact the vehicle owner.

A method of the example embodiments can comprise performing the computer network transmission flow 600 followed by the computer network transmission flow 700. A method of the example embodiments, performed by a vehicle, can comprise (i) transmitting the CNT 610, receiving the CNT 635, and/or (ii) transmitting the CNT 705 and receiving the CNT 730. A method of the example embodiments, performed by the transmission server 120, can comprise (i) receiving the CNT 610, transmitting the CNT 615, receiving the CNT 630, and transmitting the CNT 635, and/or (ii) receiving the CNT 705, transmitting the CNT 710, receiving the CNT 725, and transmitting the CNT 730. A method of the example embodiments, performed by the computing server 125, can comprise (i) receiving the CNT 615, transmitting the CNT 620, receiving the CNT 625, and transmitting the CNT 630, and/or (ii) receiving the CNT 710, transmitting the CNT 715, receiving the CNT 720, and transmitting the CNT 725. A method of the example embodiments, performed by the client computing device 130 can comprise (i) receiving the CNT 620 and transmitting the CNT 625, and/or (ii) receiving the CNT 717 and transmitting the CNT 720. Other example methods based on at least one CNT of the computer network transmission flow 600 or the computer network transmission flow 700 are also possible.

The data transferred in a CNT shown in the computer network transmission flow 600 or the computer network transmission flow 700 can be formatted in accordance with a JavaScript Object Nation (JSON) format, an extensible markup language (XLM) format, or another data format. In an alternative embodiment, an alert response from the client computing device 130 to the vehicle 735 can occur via a direct message bypassing the computing server 125 and transmission server 120, such as a text message or an e-mail message between the client computing device 130 and the vehicle 735 (e.g., the network communication device 225 or 255).

IV. Example Operation

Figure 8:
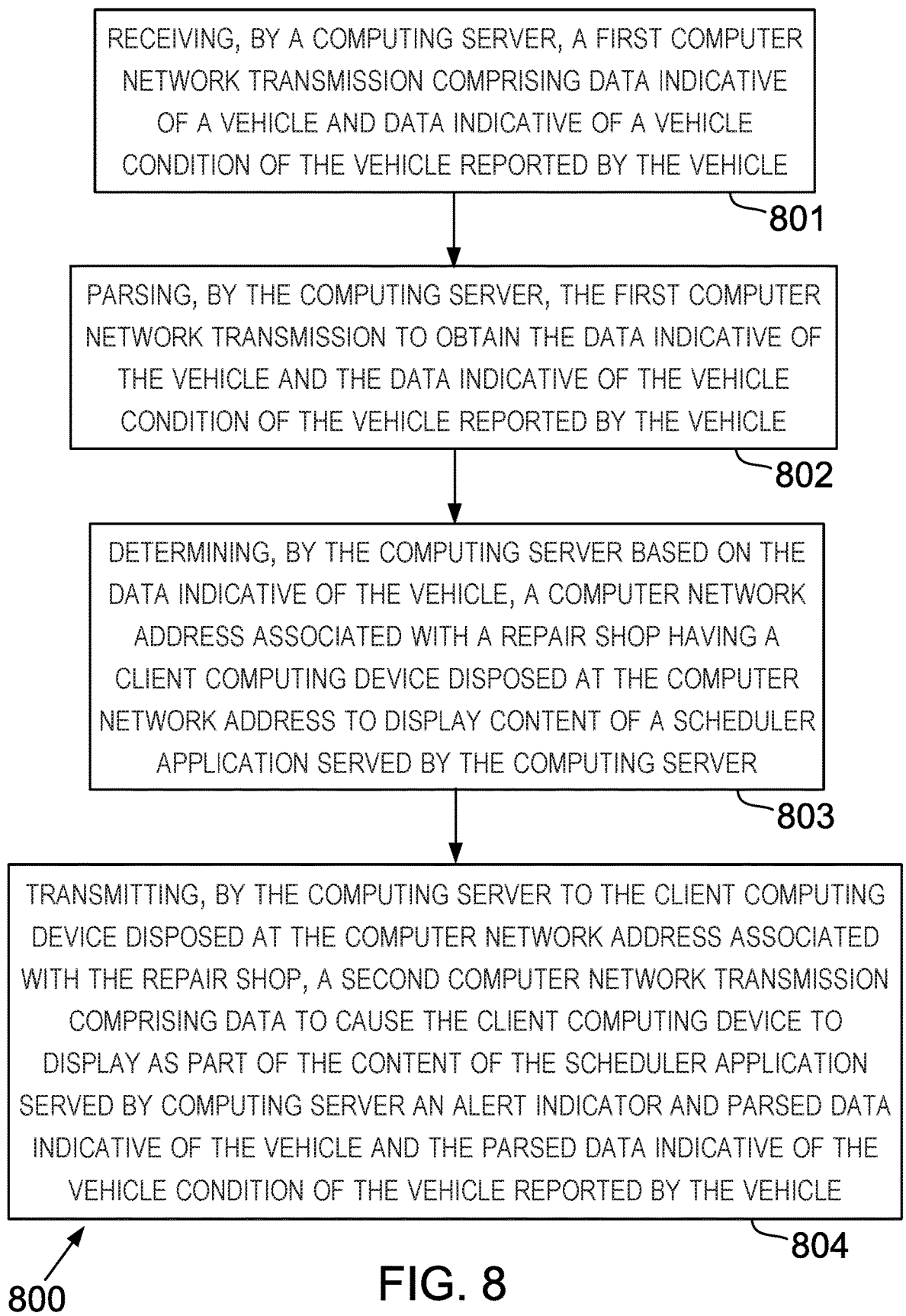
FIG. 8 is a functional block diagram illustrating an example computing device usable in a system that is arranged according to the example embodiments.

Next, FIG. 8 shows a flowchart depicting a set of functions 800 (or more simply "the set 800") that can be carried out in accordance with the example embodiments described in this description. The set 800 comprises the functions shown in blocks labeled with whole numbers 801 through 804 inclusive. The following description of the set 800 comprises references to elements shown in other figures described in this description, but the functions of the set 800 are not limited to being carried out only by the referenced elements. A variety of methods can be performed using all of the functions shown in the set 800 or any proper subset of the functions shown in the set 800. Any of those methods can be performed with other functions such as one or more of the other functions described in this description. A processor can execute CRPI to perform or cause another component to perform a function or some portion of a function of the set 800.

Block 801 includes receiving, by the computing server 125, a first computer network transmission (CNT) comprising data indicative of a vehicle and data indicative of a vehicle condition of the vehicle reported by the vehicle. As an example, receiving the first CNT can comprise receiving the CNT 710. The first CNT can comprise a communication transmitted over an internet protocol network. An internet protocol message can be transmitted according to a transmission control protocol. The internet protocol message can comprise a source port of the transmitter of the message and a destination port of the message destination.

The data indicative of the vehicle can comprise any vehicle model information described in this description. The data indicative of the vehicle can comprise any vehicle owner information described in this description. The data indicative of the vehicle condition can comprise any vehicle condition information described in this description. As an example, the data indicative of the vehicle can comprise a VIN or at least a portion of a VIN. As another example, the data indicative of the vehicle can comprise an account identifier associated with the vehicle or an owner of the vehicle.

The data indicative of the vehicle condition of the vehicle reported by the vehicle can comprise data indicative of a vehicle mileage and/or data indicative of a vehicle symptom. As an example, the data indicative of the vehicle symptom can comprise a diagnostic trouble code set within the vehicle. As another example, the data indicative of the vehicle symptom can comprise a parameter and a parameter identifier, such as a parameter indicative of a voltage and a PID indicative of a mass air flow sensor. As another example, the data indicative of the vehicle condition of the vehicle reported by the vehicle can comprise data indicative of a vehicle mileage reported by the vehicle.

The first CNT can be transmitted to the computing server 125 from the transmission server 120 via the computer network 110. The transmission sever can transmit the first CNT in response to receiving a CNT (e.g., the CNT 705) from a vehicle and/or a computer network device associated with the vehicle, such as the network communication device 225 or 255. The network transceiver 405 can receive the first CNT and provide the first CNT to the processor 400 and/or the memory 410 for storing the first CNT within the CNT data 450.

As an example, the transmission server can be communicatively coupled to the network communication device communicatively coupled to an electronic control unit in the vehicle, or a network communication device communicatively coupled to a vehicle interface device removably connected to an on-board diagnostic connector in the vehicle. The network communication device communicatively coupled to an electronic control unit in the vehicle or the network communication device communicatively coupled to a vehicle interface device can comprise a cellular communication device.

Next, block 802 includes parsing, by the computing server 125, the first computer network transmission to obtain the data indicative of the vehicle and the data indicative of the vehicle condition of the vehicle reported by the vehicle. The data indicative of the vehicle can comprise various data, such vehicle model information and vehicle owner information.

Parsing the first CNT can comprise parsing the first CNT to obtain one or more data elements regarding a vehicle model and/or one or more data elements regarding the vehicle owner. Parsing the first CNT can comprise determining what each data element represents. The data elements regarding the vehicle model can, for example, comprise a data element representing a vehicle identification number, a vehicle manufacturer name, a vehicle model year, a vehicle model name, a vehicle component (e.g., a vehicle engine), a license plate number, or a vehicle color. The data elements regarding the vehicle condition can, for example, comprise a data element representing a DTC, PID, or PID data value reported by the vehicle or a non-DTC symptom entered via an application executing on the network communication device 225 or 255. The processor 400 can cause the data elements parsed from the first CNT to be stored in the vehicle model information 425, the vehicle condition information 430, or the vehicle owner information 435. Each parsed data element comprises data.

Next, block 803 includes determining, by the computing server 125 based on the data indicative of the vehicle, a computer network address associated with a repair shop having a client computing device disposed at the computer network address to display content of a scheduler application served by the computing server 125. The computer network address associated with the determined shop identifier can comprise an internet protocol address.

Table 1 shows examples of various data elements that can be stored in the memory 410. The row numbers in Table 1 are provided for reference purposes. Rows 1, 2, 3, and 4 comprise a name of an owner listed in an order of a family name followed by a given name for the vehicle owner information. Row 5 comprises a customer identifier for the vehicle owner information. Rows 1, 3, 4, and 5 comprise a VIN for the vehicle model information. Row 2 comprises a license plate number for the vehicle model information. Rows 1 to 5 show names of repair shops to represent the repair shops. Rows 1 to 3 show example IP addresses associated with the repair shops listed in those same rows. Rows 4 and 5 show the repair shop address as null to indicate the client computing device at Pat's Tire Shop is not connected to the computing server 125. The repair shop addresses shown in Table 1 can be stored in the client computing device information 445. A repair shop address for Pat's Tire Shop can be stored with the client computing device information 445 upon a user logging into the computing server 125 from a client computing device located at or associated with Pat's Tire Shop.

TABLE 1

| Vehicle Owner | Vehicle Model | Repair Shop | Repair Shop Address | Row |
|---|---|---|---|---|
| Williams, Monica | JTHBA30G955087040 | Johnson's Repair | 192.165.1.45 | 1 |
| Perez, Juan | WA 845 333X | Mitchell's Repair | 124.45.83.0 | 2 |
| Smithers, Brenda | 3FADP4EJ9BM0123456 | ACME Repair | 209.64.34.31 | 3 |
| Jefferson, Tom | 1GKDRSKDXHJ592700 | Pat's Tire Shop | Null | 4 |
| PTS01004 | 1G1KAJ2ERXEJ704841 | Pat's Tire Shop | Null | 5 |

As an example, the processor 400 can search the memory 410 to determine the vehicle owner information or vehicle model information contained within the CNT 710 is associated with the repair shop address shown in row 1 of Table 1.

Next, block 804 includes transmitting, by the computing server 125 to the client computing device 130 disposed at the computer network address associated with the repair shop 135, a second computer network transmission comprising data to cause the client computing device 130 to display as part of the content of the scheduler application served by computing server 125 an alert indicator and parsed data indicative of the vehicle and the parsed data indicative of the vehicle condition of the vehicle reported by the vehicle. The second CNT can comprise a communication transmitted over an internet protocol network.

Additional functions can be performed as part of a method that includes performing any function of the set 800. Examples of these additional functions pertaining to a function of the set 800 are described in the following five paragraphs.

An additional function pertaining to a function of the set 800 can comprise (i) receiving, by the computing server 125, data indicating an identifier of the vehicle mileage displayed by the client computing device 130 was selected, and (ii) transmitting, by the computing server 125, a maintenance schedule (e.g., the maintenance schedule 1820) based on the vehicle mileage displayed by the client computing device 130 and based on the data indicative of the vehicle to cause the client computing device 130 to display the maintenance schedule.

An additional function pertaining to a function of the set 800 can comprise receiving, by the computing server 125 from the client computing device 130, an input to populate a schedule of the content of the scheduler application served by the computing server 125.

An additional function pertaining to a function of the set 800 can comprise receiving, by the computing server 125, a third computer network transmission comprising a request to register the vehicle, wherein the request comprises data indicative of a vehicle owner of the vehicle and data pertaining to the repair shop, and (ii) transmitting, by the computing server 125 to the client computing device 130, a fourth computer network transmission comprising data to cause the client computing device 130 to display a request identifier indicating the vehicle owner requested to register the vehicle with the schedule application for the repair shop. Furthermore, this additional function pertaining to a function of the set 800 can comprise receiving, by the computing server from the client computing device, a selection indicator indicating the request to register the vehicle is accepted by the repair shop, and storing, by the computing server, data mapping the vehicle to the repair shop. The data pertaining to the repair shop can, for example, shop comprise data indicating a name of the repair shop.

An additional function pertaining to a function of the set 800 can comprise the computing server 125 transmitting a user comment entered via a network communication device (e.g., network communication device 225 or 255) communicatively coupled to the transmission server 120. The user comment can be contained within the first computer network transmission.

An additional function pertaining to a function of the set 800 can comprise the computing server 125 receiving a geolocation identifier of the vehicle within the first computer network transmission, and transmitting the geolocation identifier of the vehicle to the client computing device 130 via the second computer network transmission.

V. Example Display Outputs

Next, FIG. 9 depicts a display output 900 in accordance with an example embodiment. The client computing device 130 can display the display output 900 on the display 515 in response to receiving the CNT 620. In particular, the processor 500 can parse the registration request of the CNT 620 to populate the display output 900 with a request identifier 905, vehicle owner information 920, and vehicle model information 925. The request identifier 905 can comprise text such as "Onboarding Request" or some other text. The request identifier 905 can comprise a numeric identifier indicative of how many registration requests are pending for accepting or declining. The display output 900 can comprise an accept selector 910 selectable by use of the keypad 520 to provide an indication to the processor 500 that the registration request has been accepted. The display output 900 can comprise a decline selector 915 selectable by use of the keypad 520 to provide an indication to the processor 500 that the registration request has been declined.

In response to determining the registration request of the CNT 620 is accepted, the processor 500 can cause the vehicle owner information 920 to be stored in the memory 510 as at least part of the vehicle owner information 545, and the vehicle model information 925 to be stored in the memory 510 as at least part of the vehicles model information 535.

Next, FIG. 10 depicts a display output 1000 in accordance with an example embodiment. The client computing device 130 can display the display output 1000 on the display 515 in response to receiving the vehicle data of the CNT 715. The display output 1000 comprises an alert indicator 1005 and an alert 1010 comprising vehicle owner information (e.g., a vehicle owner name 1020 and a vehicle owner telephone number 1030), vehicle model information 1025, vehicle condition information (e.g., a DTC identifier 1035 and a mileage indicator 1040 indicating how many miles the vehicle owner's vehicle has been driven), and a vehicle alert submission date and time 1045.

Next, FIG. 11 depicts a display output 1100 in accordance with an example embodiment. The client computing device 130 can display the display output 1100 on the display 515 in response to receiving the alert 1010 or one of the items of the alert 1010. In particular, the processor 500 can parse the vehicle data of the CNT 715 to populate the display output 1100 with vehicle owner information 1105, vehicle model information 1110, and vehicle condition information 1115. The display output 1100 can comprise a schedule selection segment 1120 at which the keypad 520 can be used to select schedule information for modifying the schedule maintained for the repair shop 135. The display output 1100 can comprise a provider segment 1125 for indicating a provider of information displayed in the display output 1100. The information populated into the provider segment 1125 can be determined from the vehicle data of the CNT 715. The display output 1100 can comprise an alert management selector 1130 to access options for modifying a schedule based on the vehicle data of the CNT 715. The display output 1100 can comprise a save and close selector 1135 for saving the vehicle data of the CNT 715 and closing the display output 1100. Closing the display output 1100 can cause the display 515 to display a different display output of the schedule application.

The schedule selection segment 1120 can comprise a drop off date and time indicating when the vehicle is expected to be dropped off at the repair shop 135, a promised date and time indicating when the vehicle will be ready for the customer after being repaired, a start date and time indicating when the repairs to the vehicle are expected to begin, and an ends date and time indicating when the repairs to the vehicle are expected to be complete. The drop off, promised, start, and ends dates and times can be default times and dates until one of the drop off, promised, start, and ends dates and times is modified. The schedule selection segment 1120 includes a scheduled hours time 1140 indicative of an projected amount of time it will take to repair the vehicle.

Figure 12:
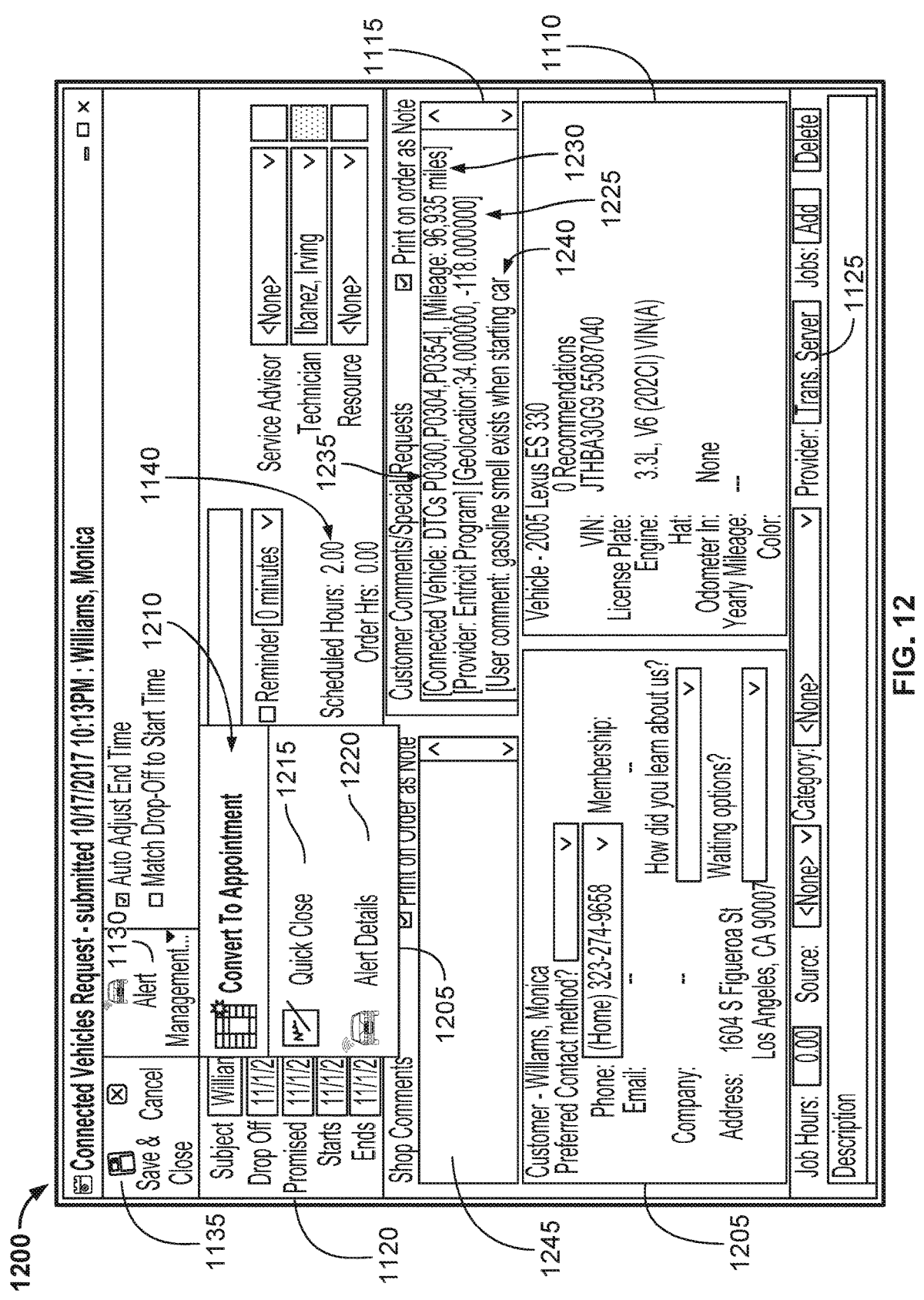

Next, FIG. 12 depicts a display output 1200 in accordance with an example embodiment. The client computing device 130 can display the display output 1200 on the display 515 in response to selection of the alert management selector 1130 (shown in FIG. 11). The display output 1200 comprises an expanded alert management selector 1205 comprising selectors such as a convert to appointment selector 1210, a quick close selector 1215, or an alert details selector 1220 selectable to provide further details regarding the vehicle data of the CNT 715 or to access a diagnostics display output pertaining to the vehicle condition indicated by the vehicle data of the CNT 715.

Selection of the quick close selector 1215 can cause the display output 1200 to highlight the shop comments field 1245 to prompt a user to enter a comment regarding the vehicle condition. The processor 500 may require the comment to be entered before the display output 1200 is closed if the quick close selector 1215 is selected. Selection of the quick close selector 1215 may be desirable when the vehicle condition does not require immediate service.

The comment entered into the shop comments field 1245 can memorialize any decisions made regarding the vehicle condition for consideration the next time the vehicle is brought to the repair shop 135.

The drop off, promised, start, and ends dates and times were modified prior to selection of the alert management selector 1130. FIG. 12 shows the ends time and date as 10:00 AM, 11/1/2017 (i.e., Nov. 1, 2017). Although not shown in FIG. 12, drop off, promised and start dates were changed to 11/1/2017, the start time was changed to 8:00 AM, the drop off time was changed to a time no later than 8:00 AM, and the promised time was changed to a time no earlier than 10:00 AM. In FIG. 12, the projected amount of time it will take to repair the vehicle in the scheduled hours time 1140 is indicative an amount of time (i.e., 2.00 hours) based on adjustments made in the schedule selection segment 1120.

The display output 1200 can comprise an identifier selectable to cause the display 515 to display a different display output. As an example, the display output 1200 can comprise a symptom identifier 1235 selectable to cause the display output to display a display output such as the display output 1400 or the display output 1500, both of which comprise information regarding the symptom shown in the symptom identifier 1235 or diagnostics selectors selectable to cause the display 515 to display information regarding the symptom shown in the symptom identifier 1235. As an example, the symptom identifier 1235 comprises a DTC identifier. Multiple symptom identifiers can be selected from the vehicle condition information 1115 to obtain relevant to each of the multiple symptoms identified by those identifiers.

As another example, the display output 1200 can comprise a mileage identifier 1230. Selection of the mileage identifier 1230 can cause the display 515 to display content regarding the vehicle identified in the vehicle model information 1110 and the identified mileage, such as the maintenance schedule 1820 shown in FIG. 18. As another example, the display output 1200 can comprise a geolocation identifier 1225 identifying a location of the vehicle reported via the CNT 715. Selection of the geolocation identifier 1225 can cause the display 515 to display the display output 1900 shown in FIG. 19.

The display output 1200 can comprise a vehicle owner comment 1240 sent via the CNT 715. As an example, the vehicle owner comment 1240 can comprise a non-DTC symptom identifier. The vehicle owner can input the vehicle owner comment 1240 via the network communication device 225 or 255 prior to transmission of the CNT 705.

Figure 13:
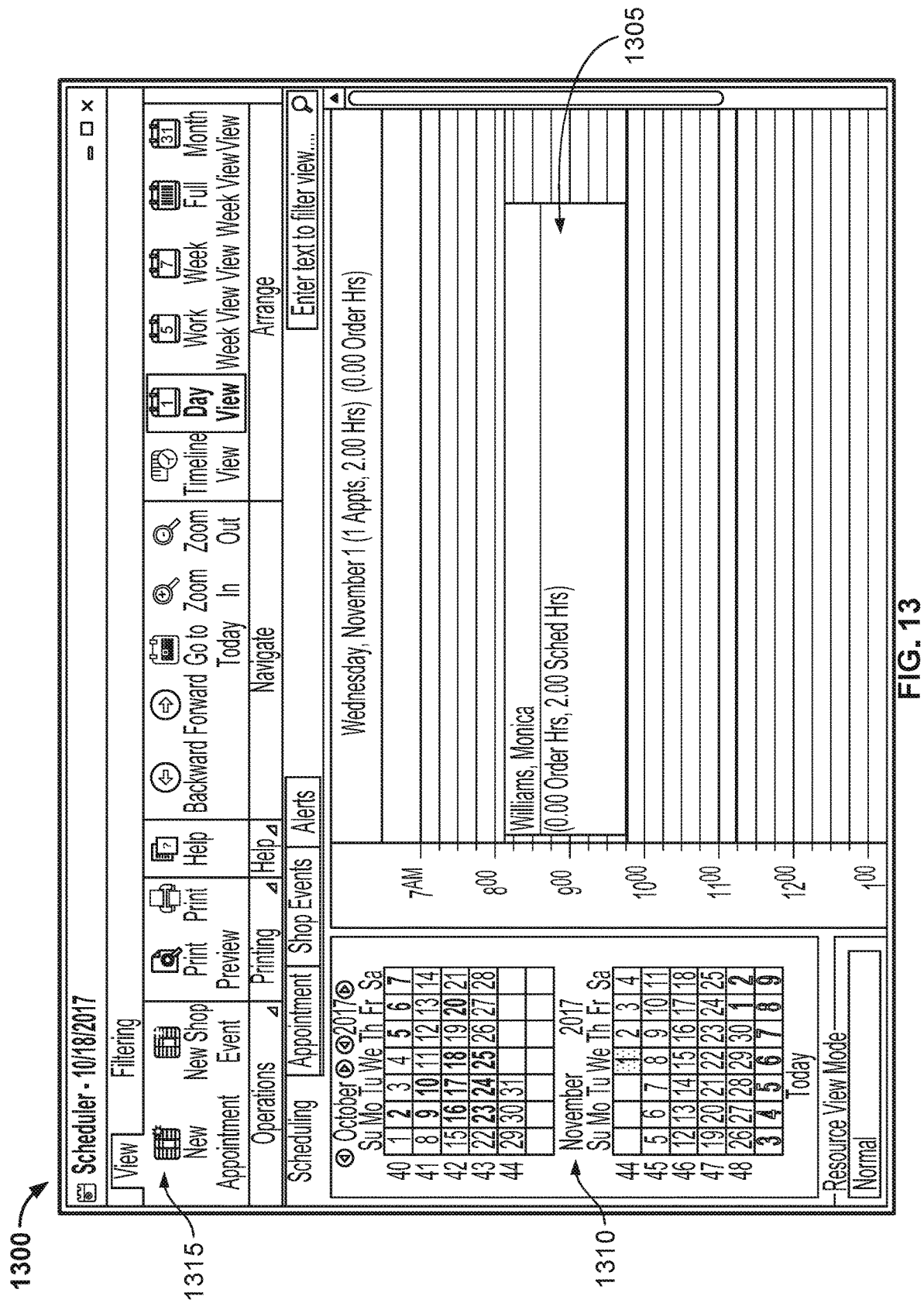

Next, FIG. 13 depicts a display output 1300 in accordance with an example embodiment. The client computing device 130 can display the display output 1300 on the display 515 in response to selection of the convert to appointment selector 1210 (shown in FIG. 12). The display output 1300 comprises a schedule entry 1305 based on the start date and time and the ends date and time selected via the schedule selection segment 1120 shown in FIG. 12. The display output 1300 comprises a calendar 1310 and a scheduling menu 1315.

Figure 14:
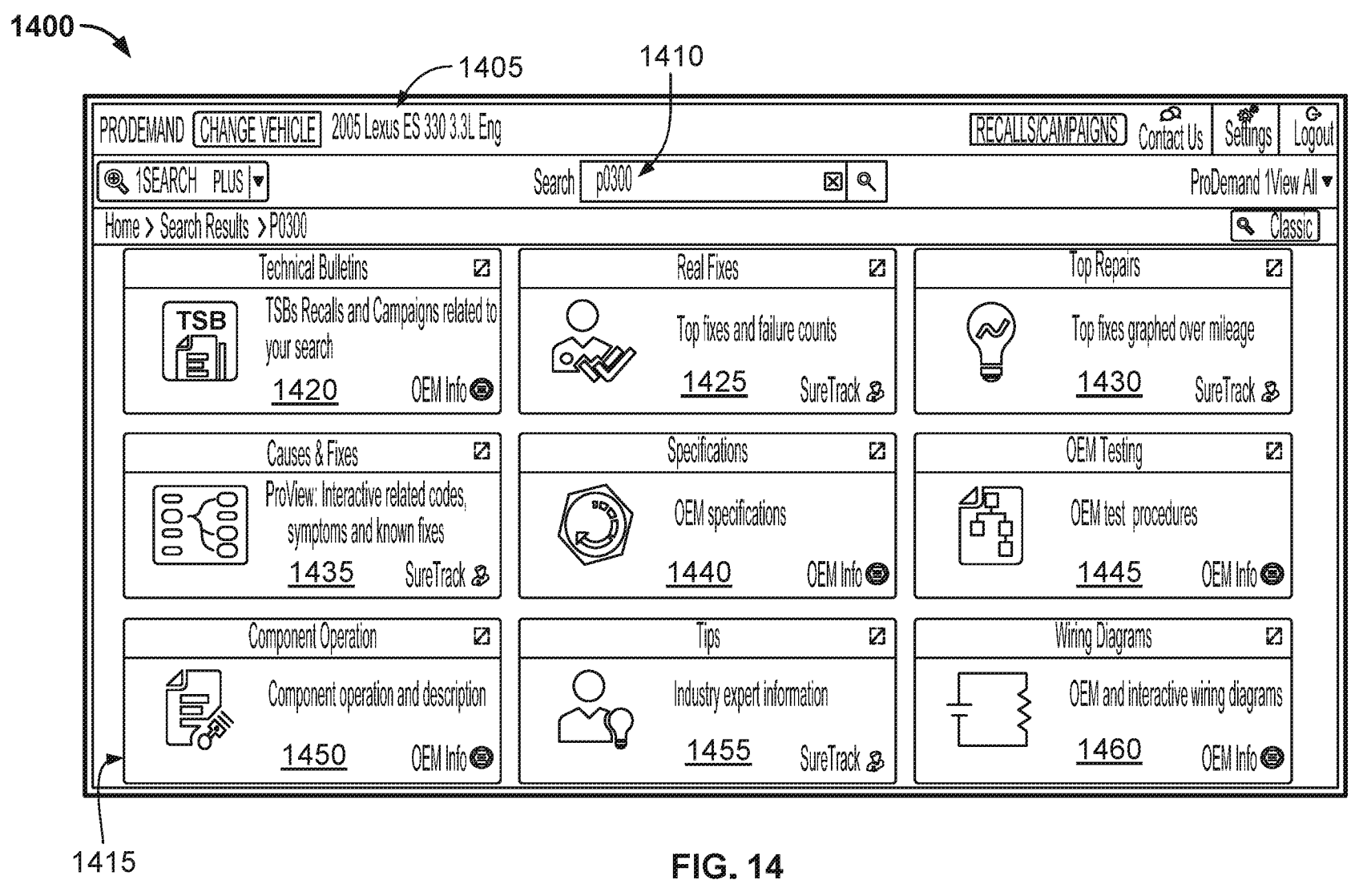

Next, FIG. 14 depicts a display output 1400 in accordance with an example embodiment. The client computing device 130 can display the display output 1400 on the display 515 in response to selection from the scheduling menu 1315, selection of the alert details selector 1220, selection of a DTC from the vehicle condition information, or some other selection. The display output 1400 comprises a vehicle model identifier 1405, a search identifier selection segment 1410, and search content 1415. The search content 1415 can comprise search content selectors such as a technical bulletins content selector 1420, a real fixes content selector 1425, a top repairs content selector 1430, a causes-and-fixes content selector 1435, a specifications content selector 1440, an OEM testing content selector 1445, a component operation content selector 1450, a tips content selector 1455, and a wiring diagrams content selector 1460. Each of the search content selectors is selectable to cause the client computing device 130 to display content related to the search criteria entered into the search identifier selection segment 1410.

Figure 15:
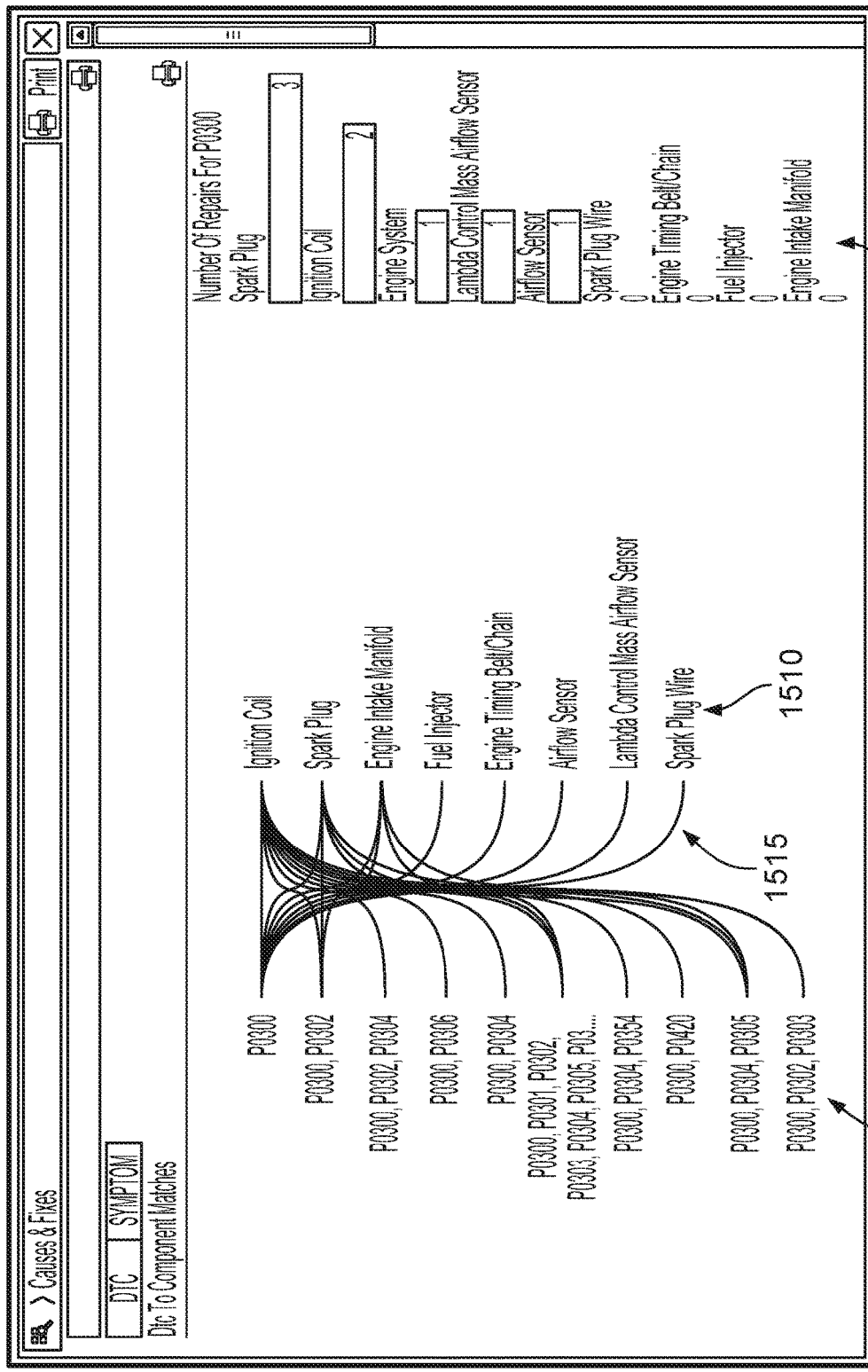

Next, FIG. 15 depicts a display output 1500 in accordance with an example embodiment. FIG. 15 shows that the client computing device 130 can display diagnostic data transmitted to the client computing device 130 from the computing server 125. The client computing device 130 can display the display output 1500 on the display 515 in response to a selection from another display output displayed by the display, such as a selection of the symptom identifier 1235 shown in FIG. 12 or the causes-and-fixes content selector 1435 shown in FIG. 14. The display output 1500 comprises DTC identifiers 1505, related component identifiers 1510, links 1515 that link each DTC identifier or group of DTC identifiers with a related component identifier. The display output 1500 comprises a chart 1520 showing a number of known occurrences of performing various repairs for a given DTC, such as the DTC identifier P0300.

Figure 18:
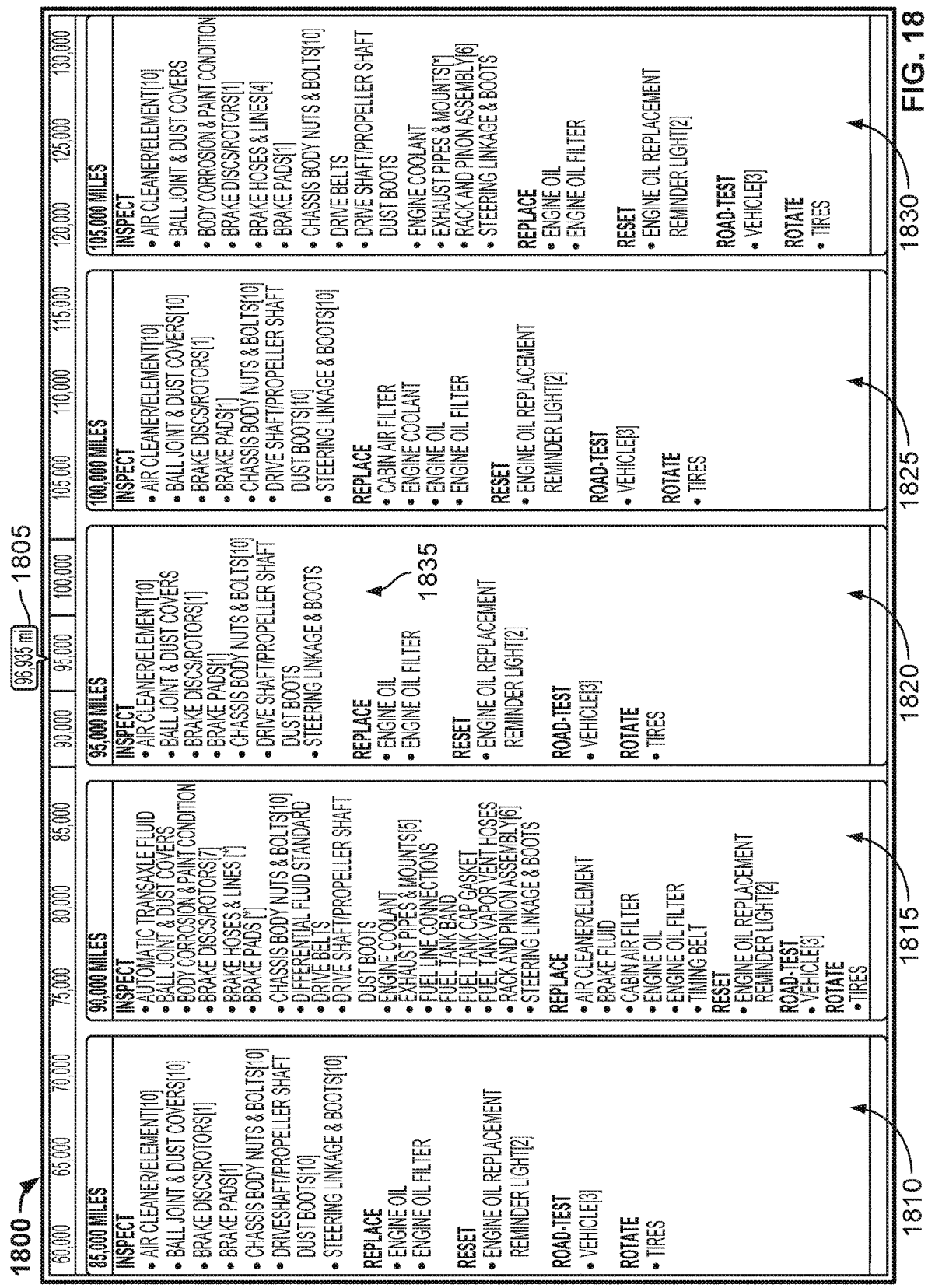
FIG. 18 and FIG. 19 show display outputs in accordance with the example embodiments.

Next, FIG. 18 depicts a display output 1800 in accordance with an example embodiment. The client computing device 130 can display the display output 1800 on the display 515 in response to selection of the mileage identifier 1230. The display output comprises a mileage identifier 1805 showing the mileage shown in the mileage identifier 1230. The mileage identifier 1805 is positioned in the display output 1800 proximate a maintenance schedule 1820 pertaining to the mileage range 85,000 to 100,000 miles. The display output 1800 can comprise other maintenance schedules for other mileage ranges, such as the maintenance schedule 1810 for the mileage range 60,000 to 70,000 miles, the maintenance schedule 1815 for the mileage range 70,000 to 85,000 miles, the maintenance schedule 1825 for the mileage range 100,000 to 115,000 miles, and the maintenance schedule 1830 for the mileage range 115,000 to 130,000 miles. A repair job in a displayed maintenance schedule, such as the repair job 1835 for an oil and oil filter replacement job, can be selected and added to a schedule for the vehicle identified in the display output 1200.

Figure 19:
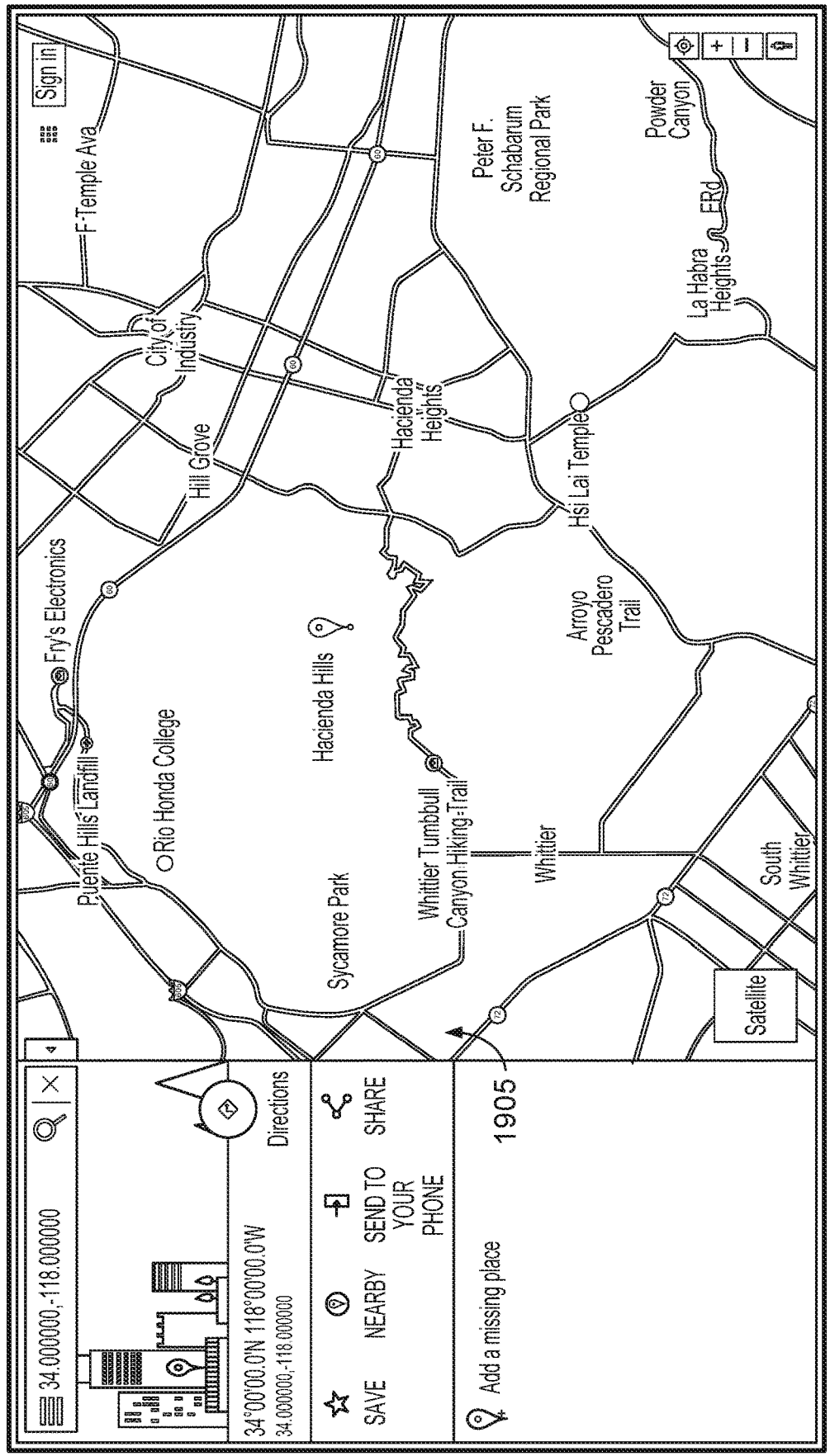

Next, FIG. 19 depicts a display output 1900 in accordance with an example embodiment. The client computing device 130 can display the display output 1900 on the display 515 in response to selection of the geolocation identifier 1225. The display output 1900 comprises a map 1905 showing a geolocation identified by the geolocation identifier 1225.

VI. Example Computing Devices

Figure 16:
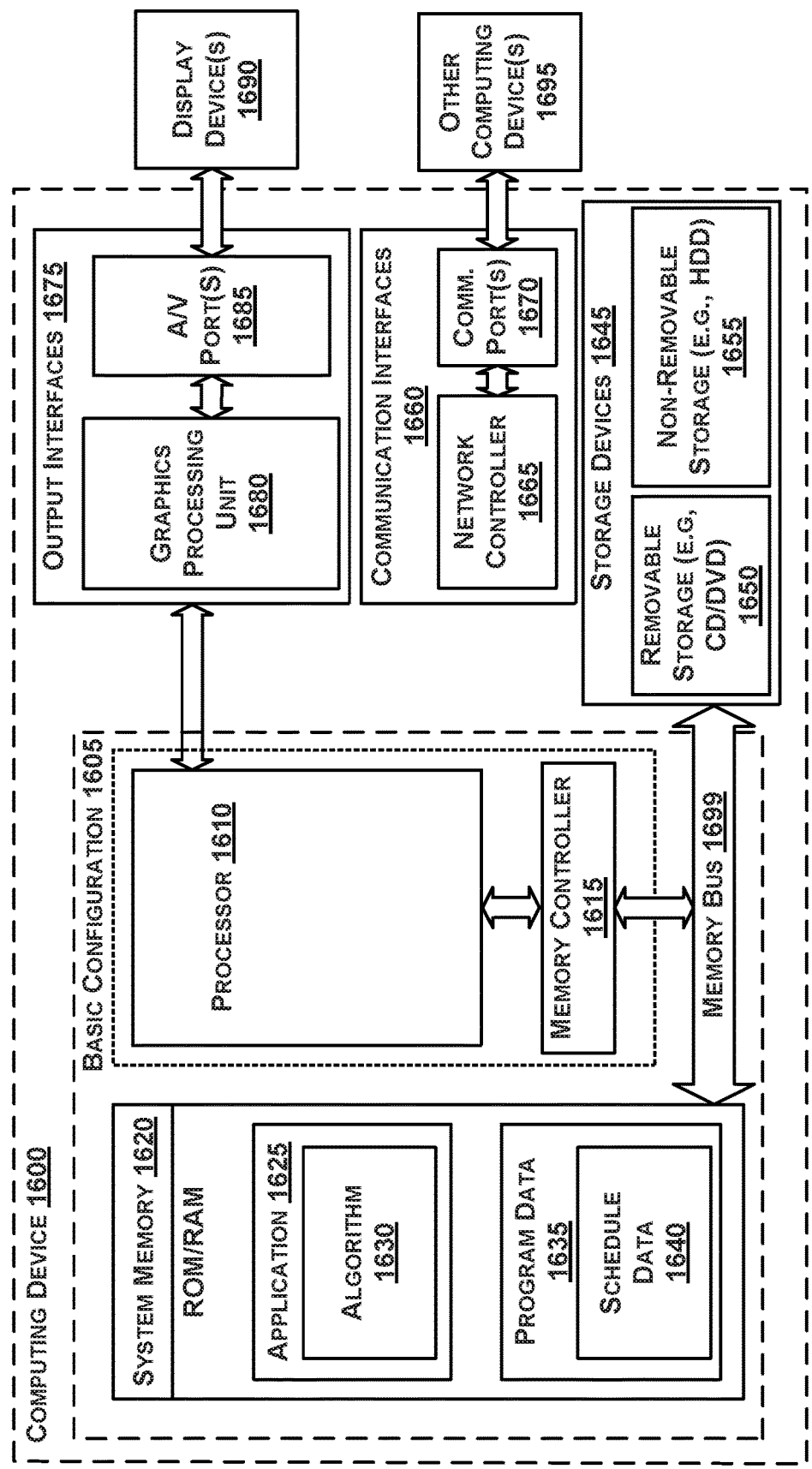
FIG. 16 is a functional block diagram illustrating a computing system that is arranged in accordance with at least some example embodiments.

FIG. 16 is a functional block diagram illustrating an example computing device 1600 used in a computing system that is arranged in accordance with at least some embodiments described herein. The computing device 1600 can be implemented to output a display output as shown in FIG. 9 to FIG. 15. In a basic configuration 1605, computing device 1600 can typically comprise one or more processors 1610 and system memory 1620. A memory bus 1699 can be used for communicating between the processor 1610 and the system memory 1620. Depending on the desired configuration, processor 1610 can be any type of processor including but not limited to a microprocessor (μP), a microcontroller (μC), a digital signal processor (DSP), or any combination thereof. A memory controller 1615 can also be used with the processor 1610, or in some implementations, the memory controller 1615 can be an internal part of the processor 1610.

Depending on the desired configuration, the system memory 1620 can be any type of computer-readable memory including but not limited to volatile memory (such as RAM), non-volatile memory (such as ROM, flash memory, etc.) or any combination thereof. System memory 1620 can comprise one or more applications 1625, and program data 1635. Application 1625 can comprise an algorithm 1630 that is arranged to receive data described with respect to FIG. 1 to FIG. 15 and provide a schedule in accordance with the present disclosure. Program data 1635 can comprise schedule data 1640 used to generate the schedule. In some example embodiments, application 1625 can be arranged to operate with program data 1635 on an operating system.

Computing device 1600 can have additional features or functionality, and additional interfaces to facilitate communications between the basic configuration 1605 and any devices and interfaces. For example, storage devices 1645 can be provided including removable storage devices 1650, non-removable storage devices 1655, or a combination thereof. Examples of removable storage and non-removable storage devices comprise magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can comprise volatile and nonvolatile, non-transitory, removable and non-removable media implemented in any method or technology for storage of information, such as computer-readable instructions, data structures, program modules, or other data.

System memory 1620 and storage devices 1645 are examples of computer storage media. Computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media can be part of computing device 1600.

Computing device 1600 can also comprise output interfaces 1675 that can comprise a graphics processing unit 1680, which can be configured to communicate to various external devices such as display devices 1690 or speakers via one or more A/V ports 1685 or a communication interface 1660. The communication interface 1660 can comprise a network controller 1665, which can be arranged to facilitate communications with one or more other computing devices over the computer network 110 via one or more communication ports 1670.

The communication connection is one example of a communication media. Communication media can be embodied by computer-readable instructions, data structures, program modules, or other data in a modulated data signal, such as a carrier wave or other transport mechanism, and comprises any information delivery media. A modulated data signal can be a signal that has one or more of its characteristics set or changed in such a manner as to encode information in the signal. By way of example, and not limitation, communication media can comprise wired media such as a wired network or direct-wired connection, and wireless media such as acoustic, radio frequency (RF), infrared (IR) and other wireless media.

Computing device 1600 can be implemented as a portion of a small-form factor portable (or mobile) electronic device such as a cell phone, a smartphone, a personal data assistant (PDA), a tablet device, a personal media player device, a wireless web-watch device, a personal headset device, an application specific device, or a hybrid device that comprise any of the above functions. Computing device 1600 can also be implemented as a personal computer, including both laptop computer and non-laptop computer configurations, or a server.

Figure 17:
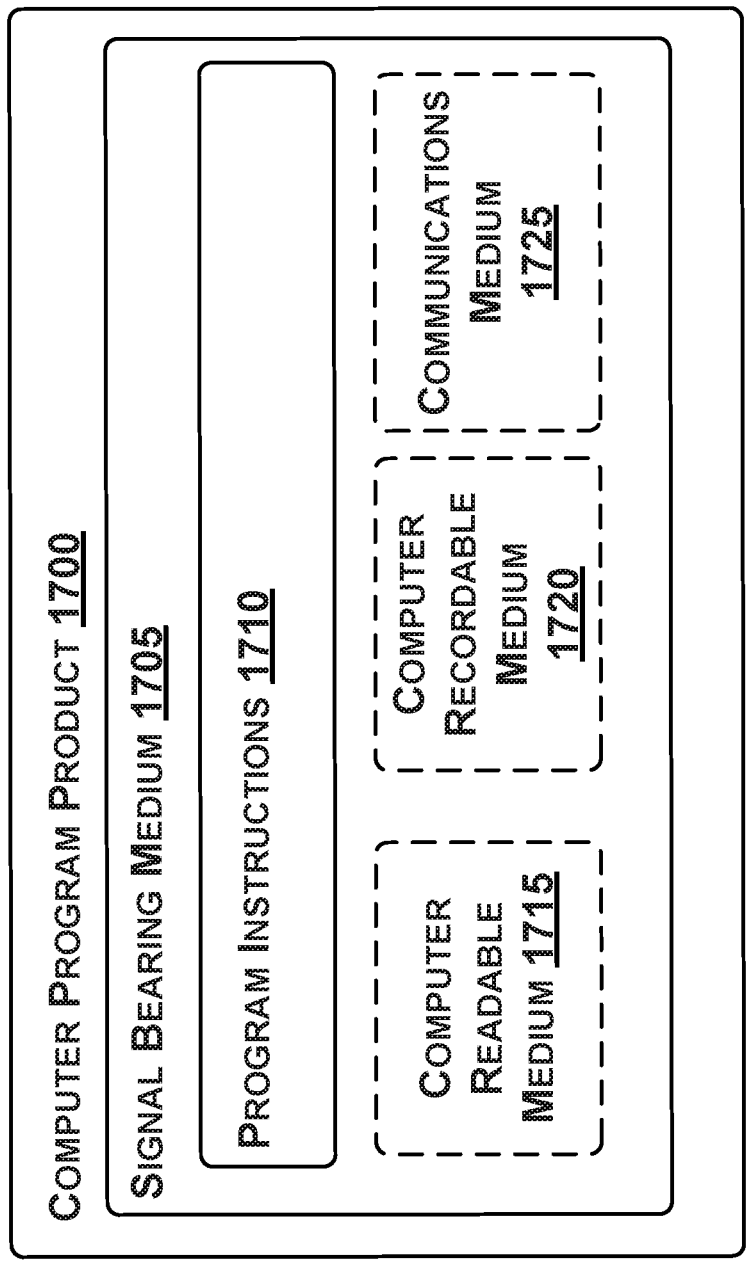
FIG. 17 is a schematic illustrating a conceptual partial view of a computer program product for executing a computer process on a computing system, according to an example embodiment.

In some embodiments, the disclosed methods can be implemented as computer program instructions encoded on a non-transitory computer-readable storage media in a machine-readable format, or on other non-transitory media or articles of manufacture. FIG. 17 is a schematic illustrating a conceptual partial view of an example computer program product 1700 that comprises a computer program for executing a computer process on a computing device, arranged according to at least some embodiments presented herein.

In one embodiment, the example computer program product 1700 is provided using a signal bearing medium 1705. The signal bearing medium 1705 can comprise one or more programming instructions 1710 that, when executed by one or more processors can provide functionality or portions of the functionality described above with respect to FIG. 1 to FIG. 16.

In some examples, the signal bearing medium 1705 can encompass a CRM 1715, such as, but not limited to, a hard disk drive, a Compact Disc (CD), a Digital Video Disk (DVD), a digital tape, memory, etc. In some implementations, the signal bearing medium 1705 can encompass a computer recordable medium 1720, such as, but not limited to, memory, read/write (R/W) CDs, R/W DVDs, etc. In some implementations, the signal bearing medium 1705 can encompass a communications medium 1725, such as, but not limited to, a digital or an analog communication medium (e.g., a fiber optic cable, a waveguide, a wired communications link, a wireless communication link, etc.). Thus, for example, the signal bearing medium 1705 can be conveyed by a wireless form of the communications medium 1725 (e.g., a wireless communications medium conforming to the IEEE 802.11 standard or some other transmission protocol).

The one or more programming instructions 1710 can be, for example, computer executable or logic implemented instructions. In some examples, a computing device such as the computing device 1600 of FIG. 32 can be configured to provide various operations, functions, or actions in response to the programming instructions 1710 conveyed to the computing device 1600 by one or more of the CRM 1715, the computer recordable medium 1720, or the communications medium 1725.

VII. Definitions

It should be understood that the arrangements described herein or shown in the drawings are for purposes of example only. As such, those skilled in the art will appreciate that other arrangements and elements (e.g., machines, interfaces, functions, orders, or groupings of functions) can be used instead, and some elements can be omitted altogether according to the desired results. The diagrams and other data shown in the figures are provided merely as examples and are not intended to be limiting. Many of the elements illustrated in the figures or described herein are functional elements that may be implemented as discrete or distributed components or in conjunction with other components, and in any suitable combination and location. Furthermore, various functions described or shown in the drawings as being performed by one or more elements can be carried out by a processor executing computer-readable program instructions or by a combination of hardware, firmware, and/or software. For purposes of this description, execution of CRPI contained in some CRM to perform some function can comprise executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can comprise transmitting the data over an air interface (e.g., using radio signals (i.e., wirelessly)). The transmission of any of the data described herein can comprise transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle identifier. The processor can determine what type of vehicle is represented by the data by comparing the data to a structure that defines a variety of vehicle makes and models.

A data element is some portion of data. The data received via a computer network transmission can comprise multiple data elements. A processor can parse the received data to determine the data element or data elements within the received data. The received data can include field names and/or field lengths defining a data element and size of the data element. The processor can be programmed with instructions based on a definition of a CNT that indicates, for example a field name and field length of data within the CNT.

In this description, the articles "a," "an," and "the" are used to introduce elements or functions of the example embodiments. The intent of using those articles is that there is one or more of the introduced elements or functions. The word "next" is used to transition from paragraphs or aspects described in the description and is not intended to indicate an order of occurrence of any functions of method.

In this description, the intent of using the term "and/or" within a list of at least two elements or functions and the intent of using the terms "at least one of," "at least one of the following," "one or more of," or "one or more of the following" immediately preceding a list of at least two components or functions is to cover each embodiment including a listed component or function independently and each embodiment comprising a combination of the listed components or functions. For example, an embodiment described as comprising "A, B, and/or C," or "at least one of A, B, or C," or "at least one of the following: A, B or C," or "one or more of A, B, or C," or "one or more of the following: A, B, or C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

Embodiments of the present disclosure may thus relate to one of the enumerated example embodiment (EEEs) listed below.

EEE 1 is a method comprising: (i) receiving, by a computing server, a first computer network transmission comprising data indicative of a vehicle and data indicative of a vehicle condition of the vehicle reported by the vehicle, (ii) parsing, by the computing server, the first computer network transmission to obtain the data indicative of the vehicle and the data indicative of the vehicle condition of the vehicle reported by the vehicle, (iii) determining, by the computing server based on the data indicative of the vehicle, a computer network address associated with a repair shop having a client computing device disposed at the computer network address to display content of a scheduler application served by the computing server, and (iv) transmitting, by the computing server to the client computing device disposed at the computer network address associated with the repair shop, a second computer network transmission comprising data to cause the client computing device to display as part of the content of the scheduler application served by computing server an alert indicator and parsed data indicative of the vehicle and the parsed data indicative of the vehicle condition of the vehicle reported by the vehicle.

EEE 2 is the method of EEE 1, wherein the first computer network transmission comprises a communication transmitted over an internet protocol network.

EEE 3 is the method of any one of EEE 1 or EEE 2, wherein the second computer network transmission comprises a communication transmitted over the internet protocol network.

EEE 4 is the method of any one of EEE 1-3, wherein the computer network address associated with the determined shop identifier comprises an internet protocol address.

EEE 5 is the method of any one of EEE 1-4, wherein the data indicative of the vehicle comprises at least a portion of a vehicle identification number or an account identifier associated with the vehicle or an owner of the vehicle.

EEE 6 is the method of any one of EEE 1-5, wherein the data indicative of the vehicle condition of the vehicle reported by the vehicle comprises at least one of: (i) data indicative of a vehicle mileage, or (ii) data indicative of a vehicle symptom.

EEE 7 is the method of EEE 6, wherein the data indicative of the vehicle symptom comprises at least one of (i) a diagnostic trouble code set within the vehicle, or (ii) a parameter and a parameter identifier.

EEE 8 is the method of any one of EEE 1-5, wherein the data indicative of the vehicle condition of the vehicle reported by the vehicle comprises data indicative of a vehicle mileage reported by the vehicle.

EEE 9 is the method of EEE 8, further comprising: (i) receiving, by the computing server, data indicating an identifier of the vehicle mileage displayed by the client computing device was selected, and (ii) transmitting, by the computing sever, a maintenance schedule based on the vehicle mileage displayed by the client computing device and based on the data indicative of the vehicle to cause the client computing device to display the maintenance schedule.

EEE 10 is the method of any one of EEE 1-9, wherein the first computer network transmission further comprises a user comment entered via a network communication device communicatively coupled to the transmission server.

EEE 11 is the method of any one of EEE 1-10, wherein the first computer network transmission receives the first computer network transmission from a transmission server.

EEE 12 is the method of EEE 11, wherein the transmission server is communicatively coupled to a network communication device communicatively coupled to an electronic control unit in the vehicle, or a network communication device communicatively coupled to a vehicle interface device removably connected to an on-board diagnostic connector in the vehicle.

EEE 13 is the method of EEE 12, wherein the network communication device communicatively coupled to an electronic control unit in the vehicle or the network communication device communicatively coupled to a vehicle interface device comprises a cellular communication device.

EEE 14 is the method of any one of EEE 1-13, wherein the first computer network transmission further comprises a geolocation identifier of the vehicle, and wherein the second computer network transmission further comprises the geolocation identifier of the vehicle.

EEE 15 is the method of any one of EEE 1-14, further comprising: receiving, by the computing server from the client computing device, an input to populate a schedule of the content of the scheduler application served by the computing server.

EEE 16 is the method of any one of EEE 1-15, further comprising: (i) receiving, by the computing server, a third computer network transmission comprising a request to register the vehicle, wherein the request comprises data indicative of a vehicle owner of the vehicle and data pertaining to the repair shop, and (ii) transmitting, by the computing server to the client computing device, a fourth computer network transmission comprising data to cause the client computing device to display a request identifier indicating the vehicle owner requested to register the vehicle with the schedule application for the repair shop.

EEE 17 is the method of EEE 16, further comprising: (i) receiving, by the computing server from the client computing device, a selection indicator indicating the request to register the vehicle is accepted by the repair shop, and (ii) storing, by the computing server, data mapping the vehicle to the repair shop.

EEE 18 is the method of EEE 16, wherein the data pertaining to the repair shop comprises data indicating a name of the repair shop.

EEE 19 is a computing system comprising: a computer-readable memory, at least one processor coupled to the computer-readable memory, and program instructions stored on the computer-readable memory and executable by the at least one processor to: (i) receive a first computer network transmission comprising data indicative of a vehicle and data indicative of a vehicle condition of the vehicle reported by the vehicle, (ii) parse the first computer network transmission to obtain the data indicative of the vehicle and the data indicative of the vehicle condition of the vehicle reported by the vehicle, (iii) determine, based on the data indicative of the vehicle, a computer network address associated with a repair shop having a client computing device disposed at the computer network address to display content of a scheduler application served by the computing server, and (iv) transmit, to the client computing device disposed at the computer network address associated with the repair shop, a second computer network transmission comprising data to cause the client computing device to display as part of the content of the scheduler application served by computing server an alert indicator and parsed data indicative of the vehicle and the parsed data indicative of the vehicle condition of the vehicle reported by the vehicle.

EEE 20 is the computing system of EEE 19, wherein the first computer network transmission comprises a communication transmitted over an internet protocol network.

EEE 21 is the computing system of any one of EEE 19 or EEE 20, wherein the second computer network transmission comprises a communication transmitted over the internet protocol network.

EEE 22 is the computing system of any one of EEE 19-21, wherein the computer network address associated with the determined shop identifier comprises an internet protocol address.

EEE 23 is the computing system of any one of EEE 19-22, wherein the data indicative of the vehicle comprises at least a portion of a vehicle identification number or an account identifier associated with the vehicle or an owner of the vehicle.

EEE 24 is the computing system of any one of EEE 19-23, wherein the data indicative of the vehicle condition of the vehicle reported by the vehicle comprises at least one of: (i) data indicative of a vehicle mileage, or (ii) data indicative of a vehicle symptom.

EEE 25 is the computing system of EEE 24, wherein the data indicative of the vehicle symptom comprises at least one of (i) a diagnostic trouble code set within the vehicle, or (ii) a parameter and a parameter identifier.

EEE 26 is the computing system of any one of EEE 19-23, wherein the data indicative of the vehicle condition of the vehicle reported by the vehicle comprises data indicative of a vehicle mileage reported by the vehicle.

EEE 27 is the computing system of EEE 26, wherein the program instructions are executable to: (i) receive data indicating an identifier of the vehicle mileage displayed by the client computing device was selected, and (ii) transmit a maintenance schedule based on the vehicle mileage displayed by the client computing device and based on the data indicative of the vehicle to cause the client computing device to display the maintenance schedule.

EEE 28 is the computing system of any one of EEE 19-27, wherein the first computer network transmission further comprises a user comment entered via a network communication device communicatively coupled to the transmission server.

EEE 29 is the computing system of any one of EEE 19-28, wherein the first computer network transmission receives the first computer network transmission from a transmission server.

EEE 30 is the computing system of EEE 29, wherein the transmission server is communicatively coupled to a network communication device communicatively coupled to an electronic control unit in the vehicle, or a network communication device communicatively coupled to a vehicle interface device removably connected to an on-board diagnostic connector in the vehicle.

EEE 31 is the computing system of EEE 30, wherein the network communication device communicatively coupled to an electronic control unit in the vehicle or the network communication device communicatively coupled to a vehicle interface device comprises a cellular communication device.

EEE 32 is the computing system of any one of EEE 19-31, wherein the first computer network transmission further comprises a geolocation identifier of the vehicle, and wherein the second computer network transmission further comprises the geolocation identifier of the vehicle.

EEE 33 is the computing system of any one of EEE 19-32, wherein the program instructions are executable to: receive, from the client computing device, an input to populate a schedule of the content of the scheduler application served by the computing server.

EEE 34 is the computing system of any one of EEE 19-33, wherein the program instructions are executable to: (i) receive a third computer network transmission comprising a request to register the vehicle, wherein the request comprises data indicative of a vehicle owner of the vehicle and data pertaining to the repair shop, and (ii) transmit, to the client computing device, a fourth computer network transmission comprising data to cause the client computing device to display a request identifier indicating the vehicle owner requested to register the vehicle with the schedule application for the repair shop.

EEE 35 is the computing system of EEE 34, wherein the program instructions are executable to: (i) receive, from the client computing device, a selection indicator indicating the request to register the vehicle is accepted by the repair shop, and (ii) store data mapping the vehicle to the repair shop.

EEE 36 is the computing system of EEE 34, wherein the data pertaining to the repair shop comprises data indicating a name of the repair shop.

EEE 37 is a computer readable medium configured to store at least executable instructions, wherein the executable instructions, when executed by a processor of a computing device, cause the computing device to perform functions comprising: (i) receiving a first computer network transmission comprising data indicative of a vehicle and data indicative of a vehicle condition of the vehicle reported by the vehicle, (ii) parsing the first computer network transmission to obtain the data indicative of the vehicle and the data indicative of the vehicle condition of the vehicle reported by the vehicle, (iii) determining, based on the data indicative of the vehicle, a computer network address associated with a repair shop having a client computing device disposed at the computer network address to display content of a scheduler application served by the computing server, and (iv) transmitting, to the client computing device disposed at the computer network address associated with the repair shop, a second computer network transmission comprising data to cause the client computing device to display as part of the content of the scheduler application served by computing server an alert indicator and parsed data indicative of the vehicle and the parsed data indicative of the vehicle condition of the vehicle reported by the vehicle.

EEE 38 is the computer readable medium of EEE 37, wherein the first computer network transmission comprises a communication transmitted over an internet protocol network.

EEE 39 is the computer readable medium of any one of EEE 37 or EEE 38, wherein the second computer network transmission comprises a communication transmitted over the internet protocol network.

EEE 40 is the computer readable medium of any one of EEE 37-39, wherein the computer network address associated with the determined shop identifier comprises an internet protocol address.

EEE 41 is the computer readable medium of any one of EEE 37-40, wherein the data indicative of the vehicle comprises at least a portion of a vehicle identification number or an account identifier associated with the vehicle or an owner of the vehicle.

EEE 42 is the computer readable medium of any one of EEE 37-41, wherein the data indicative of the vehicle condition of the vehicle reported by the vehicle comprises at least one of: (i) data indicative of a vehicle mileage, or (ii) data indicative of a vehicle symptom.

EEE 43 is the computer readable medium of EEE 42, wherein the data indicative of the vehicle symptom comprises at least one of (i) a diagnostic trouble code set within the vehicle, or (ii) a parameter and a parameter identifier.

EEE 44 is the computer readable medium of any one of EEE 37-41, wherein the data indicative of the vehicle condition of the vehicle reported by the vehicle comprises data indicative of a vehicle mileage reported by the vehicle.

EEE 45 is the computer readable medium of EEE 44, further comprising: (i) receiving, by the computing server, data indicating an identifier of the vehicle mileage displayed by the client computing device was selected, and (ii) transmitting, by the computing sever, a maintenance schedule based on the vehicle mileage displayed by the client computing device and based on the data indicative of the vehicle to cause the client computing device to display the maintenance schedule.

EEE 46 is the computer readable medium of any one of EEE 37-45, wherein the first computer network transmission further comprises a user comment entered via a network communication device communicatively coupled to the transmission server.

EEE 47 is the computer readable medium of any one of EEE 37-46, wherein the first computer network transmission receives the first computer network transmission from a transmission server.

EEE 48 is the computer readable medium of EEE 47, wherein the transmission server is communicatively coupled to a network communication device communicatively coupled to an electronic control unit in the vehicle, or a network communication device communicatively coupled to a vehicle interface device removably connected to an on-board diagnostic connector in the vehicle.

EEE 49 is the computer readable medium of EEE 48, wherein the network communication device communicatively coupled to an electronic control unit in the vehicle or the network communication device communicatively coupled to a vehicle interface device comprises a cellular communication device.

EEE 50 is the computer readable medium of any one of EEE 37-49, wherein the first computer network transmission further comprises a geolocation identifier of the vehicle, and wherein the second computer network transmission further comprises the geolocation identifier of the vehicle.

EEE 51 is the computer readable medium of any one of EEE 37-50, further comprising: receiving, by the computing server from the client computing device, an input to populate a schedule of the content of the scheduler application served by the computing server.

EEE 52 is the computer readable medium of any one of EEE 37-51, further comprising: (i) receiving, by the computing server, a third computer network transmission comprising a request to register the vehicle, wherein the request comprises data indicative of a vehicle owner of the vehicle and data pertaining to the repair shop, and (ii) transmitting, by the computing server to the client computing device, a fourth computer network transmission comprising data to cause the client computing device to display a request identifier indicating the vehicle owner requested to register the vehicle with the schedule application for the repair shop.

EEE 53 is the computer readable medium of EEE 52, further comprising: (i) receiving, by the computing server from the client computing device, a selection indicator indicating the request to register the vehicle is accepted by the repair shop, and (ii) storing, by the computing server, data mapping the vehicle to the repair shop.

EEE 54 is the computer readable medium of EEE 52, wherein the data pertaining to the repair shop comprises data indicating a name of the repair shop.

We claim:

1. A method comprising: receiving, by a computing server, a first computer network transmission comprising a request to register a vehicle, wherein the request comprises: a vehicle identifier corresponding to the vehicle, vehicle owner information regarding an owner of the vehicle, and a repair shop identifier corresponding to a particular repair shop;
storing, by the computing server, mapping data that maps the vehicle identifier to both the vehicle owner information and the repair shop identifier;
receiving, by the computing server, a second computer network transmission, wherein:
the second computer network transmission comprises reported vehicle data from the vehicle, and
the reported vehicle data includes the vehicle identifier, data indicative of a vehicle condition of the vehicle, and a geolocation identifier of the vehicle, and
parsing, by the computing server, the reported vehicle data to obtain the vehicle identifier, the data indicative of the vehicle condition, and the geolocation identifier of the vehicle;
determining, by the computing server based on the vehicle identifier parsed from the reported vehicle data and the mapping data, a computer network address associated with the repair shop identifier and the vehicle owner information;
transmitting, by the computing server to a client computing device disposed at the computer network address, a third computer network transmission that includes the vehicle owner information determined from the mapping data and the reported vehicle data;
displaying, on a display at the client computing device after receipt of the third computer network transmission, a first graphical user interface including:
the vehicle identifier,
the data indicative of the vehicle condition, the geolocation identifier of the vehicle,
a schedule selection segment,
a date and time entered by a user using the schedule selection segment, and
a control selectable to convert the date and time entered using the schedule selection segment into an appointment corresponding to the vehicle, and
displaying, on the display at the client computing device, a second graphical user interface including a schedule entry for the appointment corresponding to the vehicle.

2. The method of claim 1, wherein the second computer network transmission, the third computer network transmission, or both the second computer network transmission and the third computer network transmission comprises a communication transmitted over an internet protocol network.

3. The method of claim 1, wherein the computer network address associated with the repair shop identifier comprises an internet protocol address.

4. The method of claim 1, wherein the vehicle identifier comprises at least a portion of a vehicle identification number or an account identifier associated with the vehicle or an owner of the vehicle.

5. The method of claim 1, wherein the data indicative of the vehicle condition of the vehicle reported by the vehicle comprises: data indicative of a vehicle mileage, data indicative of a vehicle symptom, or both the data indicative of the vehicle mileage and the data indicative of the vehicle symptom.

6. The method of claim 5, wherein the data indicative of the vehicle symptom comprises: a diagnostic trouble code set within the vehicle, a parameter and a parameter identifier, or both the diagnostic trouble code set within the vehicle and the parameter and the parameter identifier.

7. The method of claim 1, wherein the data indicative of the vehicle condition of the vehicle reported by the vehicle comprises data indicative of a vehicle mileage reported by the vehicle.

8. The method of claim 7, further comprising:
receiving, by the computing server, data indicating an identifier of the vehicle mileage displayed by the client computing device was selected; and
transmitting, by the computing sever, a maintenance schedule based on the vehicle mileage displayed by the client computing device and based on the data indicative of the vehicle to cause the client computing device to display the maintenance schedule.

9. The method of claim 1, wherein the second computer network transmission further comprises a user comment entered via a network communication device communicatively coupled to the computing server.

10. The method of claim 1, wherein:
the computing server receives the second computer network transmission from a transmission server, and
the transmission server is communicatively coupled to a network communication device communicatively coupled to an electronic control unit in the vehicle, or a network communication device communicatively coupled to a vehicle interface device removably connected to an on-board diagnostic connector in the vehicle.

11. The method of claim 10, wherein the network communication device communicatively coupled to an electronic control unit in the vehicle or the network communication device communicatively coupled to a vehicle interface device comprises a cellular communication device.

12. The method of claim 1, further comprising:
transmitting, by the computing server to the client computing device, a fourth computer network transmission comprising data to cause the client computing device to display a request identifier indicating the owner of the vehicle requested to register the vehicle with a scheduler application for the particular repair shop.

13. The method of claim 12, further comprising:
receiving, by the computing server from the client computing device, a selection indicator indicating the request to register the vehicle is accepted by the particular repair shop; and
storing, by the computing server, data mapping the vehicle to the particular repair shop.

14. The method of claim 13, wherein the data mapping the vehicle to the particular repair shop comprises data indicating a name of the particular repair shop.

15. The method of claim 12,
wherein the scheduler application is configured to display a map showing a geolocation identified by the geolocation identifier of the vehicle.

16. The method of claim 15, wherein the date and time entered by the user using the schedule selection segment includes a date and time indicating when the vehicle is expected to be dropped off at the particular repair shop.

17. The method of claim 1, wherein the data indicative of the vehicle condition includes one or more from among: a diagnostic trouble code identifier from an electronic control unit (ECU) in the vehicle or a parameter identifier (PID) and a PID data value from the ECU.

18. The method of claim 1, wherein:
the mapping data includes the computer network address associated with the repair shop identifier, and
the particular repair shop has a client computing device disposed at the computer network address.

19. The method of claim 1, wherein the schedule selection segment includes a time value indicating an expected amount of time it will take to repair the vehicle having the vehicle condition.

20. A system comprising:
a client computing device; and
a computing server including:
a non-transitory computer-readable memory;
at least one processor coupled to the non-transitory computer-readable memory; and
program instructions stored on the non-transitory computer-readable memory and executable by the at least one processor to:
receive a first computer network transmission comprising a request to register a vehicle, wherein the request comprises: a vehicle identifier corresponding to the vehicle, vehicle owner information regarding an owner of the vehicle, and a repair shop identifier corresponding to a particular repair shop;
store mapping data that maps the vehicle identifier to both the vehicle owner information and the repair shop identifier;
receive a second computer network transmission, wherein:
the second computer network transmission comprises reported vehicle data from the vehicle, and
the reported vehicle data includes the vehicle identifier, data indicative of a vehicle condition of the vehicle, and a geolocation identifier of the vehicle;

parse the reported vehicle data to obtain the vehicle identifier, the data indicative of the vehicle condition, and the geolocation identifier of the vehicle;

determine, based on the vehicle identifier parsed from the reported vehicle data and the mapping data, a computer network address associated with the repair shop identifier and the vehicle owner information; and transmit, to the client computing device disposed at the computer network address, a third computer network transmission that includes the vehicle owner information determined from the mapping data and the reported vehicle data;

wherein the client computing device is configured to display, on a display after receipt of the third computer network transmission, a first graphical user interface including:

the vehicle identifier, the data indicative of the vehicle condition, the geolocation identifier of the vehicle, a schedule selection segment, a date and time entered by a user using the schedule selection segment, and a control selectable to convert the date and time entered using the schedule selection segment into an appointment corresponding to the vehicle, and wherein the client computing device is configured to display, on the display, a second graphical user interface including a schedule entry for the appointment corresponding to the vehicle.

* * * * *